United States Patent
Powell et al.

(10) Patent No.: US 9,580,602 B2
(45) Date of Patent: Feb. 28, 2017

(54) METHODS AND SYSTEMS FOR PROCESSING LIGNIN DURING HYDROTHERMAL DIGESTION OF CELLULOSIC BIOMASS SOLIDS

(71) Applicant: SHELL OIL COMPANY, Houston, TX (US)

(72) Inventors: Joseph Broun Powell, Houston, TX (US); Kimberly Ann Johnson, Richmond, TX (US); Glenn Charles Komplin, Katy, TX (US); Juben Nemchand Chheda, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 14/067,250

(22) Filed: Oct. 30, 2013

(65) Prior Publication Data

US 2014/0117275 A1    May 1, 2014

Related U.S. Application Data

(60) Provisional application No. 61/720,765, filed on Oct. 31, 2012.

(51) Int. Cl.
*D21C 3/20* (2006.01)
*C08L 97/00* (2006.01)
(Continued)

(52) U.S. Cl.
CPC ............ *C08L 97/005* (2013.01); *C10G 1/002* (2013.01); *C10G 1/065* (2013.01); *C10G 3/50* (2013.01);
(Continued)

(58) Field of Classification Search
CPC .................... D21C 3/20; C08G 2300/1014
See application file for complete search history.

(56) References Cited

U.S. PATENT DOCUMENTS 3,882,015 A * 5/1975 Carson ........................ 208/169
4,017,642 A * 4/1977 Orth et al. .................... 426/69
(Continued)

FOREIGN PATENT DOCUMENTS

CN   102127462   7/2011
CN   102414297   9/2014
(Continued)

OTHER PUBLICATIONS

Luo, Chen et al., Luo, Chen et al., Cellulose Conversion into Polyols Catalyzed by Reversibly Formed Acids.
(Continued)

*Primary Examiner* — Liam J Heincer

(57) ABSTRACT

Digestion of cellulosic biomass solids may be complicated by lignin release therefrom, which can produce a highly viscous phenolics liquid phase comprising lignin polymer. Methods for digesting cellulosic biomass solids may comprise: providing cellulosic biomass solids in the presence of a digestion solvent, molecular hydrogen, and a slurry catalyst capable of activating molecular hydrogen; at least partially converting the cellulosic biomass solids into a phenolics liquid phase comprising lignin, an aqueous phase comprising an alcoholic component derived from the cellulosic biomass solids, and an optional light organics phase; wherein at least a portion of the slurry catalyst accumulates in the phenolics liquid phase as it forms; and reducing the viscosity of the phenolics liquid phase.

22 Claims, 2 Drawing Sheets

(51) Int. Cl.
*C10G 1/00* (2006.01)
*C10G 1/06* (2006.01)
*C10G 3/00* (2006.01)
*D21C 11/00* (2006.01)

(52) U.S. Cl.
CPC .. *D21C 11/0007* (2013.01); *C10G 2300/1014* (2013.01); *C10G 2300/302* (2013.01); *Y02P 30/20* (2015.11)

(56) References Cited

U.S. PATENT DOCUMENTS

| | | | |
|---|---|---|---|
| 4,105,467 A * | 8/1978 | Buckl et al. | 127/37 |
| 4,259,294 A * | 3/1981 | Van Zijll Langhout et al. | 422/608 |
| 4,536,584 A * | 8/1985 | Eskamani et al. | 549/429 |
| 4,968,409 A * | 11/1990 | Smith | 208/157 |
| 5,916,529 A * | 6/1999 | Scheuerman | 422/141 |
| 6,030,915 A | 2/2000 | de Boer | |
| 6,086,749 A * | 7/2000 | Kramer et al. | 208/213 |
| 6,127,229 A | 10/2000 | Chu et al. | |
| 8,262,905 B2 | 9/2012 | Gabrielov | |
| 8,263,792 B2 * | 9/2012 | Robinson | 549/483 |
| 8,729,325 B2 | 5/2014 | Powell | |
| 9,222,028 B2 | 12/2015 | Powell | |
| 2008/0025903 A1 * | 1/2008 | Cortright | 423/437.1 |
| 2008/0058563 A1 * | 3/2008 | Dumesic et al. | 585/240 |
| 2008/0216391 A1 | 9/2008 | Cortright et al. | |
| 2008/0312479 A1 * | 12/2008 | McCall et al. | 585/240 |
| 2009/0326286 A1 * | 12/2009 | Yie et al. | 585/240 |
| 2010/0137663 A1 * | 6/2010 | Chen | C10G 1/002 585/252 |
| 2010/0236988 A1 | 9/2010 | Gabrielov et al. | |
| 2011/0094149 A1 * | 4/2011 | Weiss et al. | 44/308 |
| 2011/0154722 A1 * | 6/2011 | Chheda et al. | 44/307 |
| 2011/0167713 A1 * | 7/2011 | Quignard et al. | 44/307 |
| 2011/0245444 A1 * | 10/2011 | Miller et al. | 526/346 |
| 2011/0312050 A1 | 12/2011 | Zhang et al. | |
| 2011/0313208 A1 * | 12/2011 | Kalnes et al. | 568/852 |
| 2011/0313212 A1 * | 12/2011 | Kalnes et al. | 568/913 |
| 2012/0151827 A1 * | 6/2012 | Powell et al. | 44/307 |
| 2012/0152836 A1 * | 6/2012 | Powell et al. | 210/620 |
| 2012/0156742 A1 * | 6/2012 | Powell et al. | 435/155 |
| 2012/0157730 A1 * | 6/2012 | Powell et al. | 585/242 |
| 2012/0167875 A1 * | 7/2012 | Qiao et al. | 127/36 |
| 2012/0167876 A1 | 7/2012 | Qiao et al. | |
| 2012/0172579 A1 * | 7/2012 | Qiao et al. | 530/500 |
| 2012/0198760 A1 * | 8/2012 | Blommel et al. | 44/437 |
| 2012/0317872 A1 | 12/2012 | Powell et al. | |
| 2012/0317873 A1 * | 12/2012 | Johnson et al. | 44/307 |
| 2012/0318258 A1 * | 12/2012 | Qiao et al. | 127/36 |
| 2012/0323051 A1 * | 12/2012 | Powell | 568/913 |
| 2013/0030230 A1 * | 1/2013 | Brandvold et al. | 585/242 |
| 2013/0059354 A1 * | 3/2013 | Borresen et al. | 435/160 |
| 2013/0109896 A1 * | 5/2013 | Powell et al. | 585/240 |
| 2013/0152456 A1 * | 6/2013 | Powell | 44/307 |
| 2013/0152457 A1 * | 6/2013 | Powell et al. | 44/307 |
| 2013/0152458 A1 * | 6/2013 | Powell et al. | 44/307 |
| 2013/0158308 A1 * | 6/2013 | Powell | 585/240 |
| 2013/0165698 A1 * | 6/2013 | Powell | 568/863 |
| 2013/0232853 A1 * | 9/2013 | Peterson et al. | 44/307 |
| 2013/0305594 A1 * | 11/2013 | Shuai et al. | 44/330 |
| 2014/0000153 A1 * | 1/2014 | Powell | 44/307 |
| 2014/0000154 A1 * | 1/2014 | Powell | 44/307 |
| 2014/0004015 A1 * | 1/2014 | Denton et al. | 422/187 |
| 2014/0005444 A1 * | 1/2014 | Komplin et al. | 568/861 |
| 2014/0005445 A1 * | 1/2014 | Komplin et al. | 568/861 |
| 2014/0031599 A1 * | 1/2014 | Komplin et al. | 585/240 |
| 2014/0096764 A1 * | 4/2014 | Komplin et al. | 127/1 |
| 2014/0109464 A1 * | 4/2014 | Powell et al. | 44/307 |
| 2014/0114082 A1 * | 4/2014 | van Walsem et al. | 549/509 |
| 2014/0116425 A1 * | 5/2014 | Powell et al. | 127/2 |
| 2014/0117275 A1 * | 5/2014 | Powell et al. | 252/182.31 |
| 2014/0117276 A1 | 5/2014 | Powell et al. | |
| 2014/0117277 A1 * | 5/2014 | Powell et al. | 252/182.31 |
| 2014/0121418 A1 * | 5/2014 | Powell et al. | 568/799 |
| 2014/0121419 A1 * | 5/2014 | Powell et al. | 568/861 |
| 2014/0121420 A1 * | 5/2014 | Powell et al. | 568/865 |
| 2014/0128639 A1 * | 5/2014 | Powell et al. | 568/840 |
| 2014/0171694 A1 * | 6/2014 | Powell et al. | 568/903 |
| 2014/0275513 A1 * | 9/2014 | Powell | 536/56 |
| 2014/0275514 A1 * | 9/2014 | Powell et al. | 536/56 |
| 2014/0275515 A1 * | 9/2014 | Powell et al. | 536/56 |
| 2014/0330049 A1 * | 11/2014 | Powell et al. | 568/865 |

FOREIGN PATENT DOCUMENTS

| | | |
|---|---|---|
| EP | 2182047 | 5/2010 |
| FR | 2955118 | 7/2011 |
| WO | 2012060961 | 5/2012 |
| WO | 2012092475 | 7/2012 |
| WO | WO2012174103 | 12/2012 |
| WO | WO2013089798 | 6/2013 |
| WO | WO2013089799 | 6/2013 |
| WO | 2014004844 | 1/2014 |
| WO | 2014004867 | 1/2014 |
| WO | WO2014004842 | 1/2014 |
| WO | WO2014004848 | 1/2014 |
| WO | WO2014004859 | 1/2014 |
| WO | 2014070580 | 5/2014 |
| WO | 2014070583 | 5/2014 |

OTHER PUBLICATIONS

ISR—PCT/US2013/066660, International Search Report dated Mar. 10, 2014.
ISR—PCT/US2013/066666, International Search Report dated Feb. 14, 2014.
ISR—PCT/US2013/066631, International Search Report dated Feb. 21, 2014.
ISR—PCT/US2013/066623, International Search Report dated Feb. 12, 2014.
ISR—PCT/US2013/066653, International Search Report dated Mar. 10, 2014.
ISR—PCT/US2013/066625, International Search Report dated Mar. 10, 2014.
ISR—PCT/US2013/066638, International Search Report dated Dec. 13, 2013.
ISR—PCT/US2013/066642, International Search Report datedDec. 12, 2013.
International Search Report for Ref. No. TH5366-PCT dated Dec. 12, 2013 for Application PCT/US2013/066638 filed Oct. 24, 2013.
International Search Report for Ref. No. TH5409-PCT dated Dec. 12, 2013 for Application PCT/US2013/066642 filed Oct. 24, 2013.
Chinese Office Action dated Nov. 12, 2015; 19 pages.

* cited by examiner

METHODS AND SYSTEMS FOR PROCESSING LIGNIN DURING HYDROTHERMAL DIGESTION OF CELLULOSIC BIOMASS SOLIDS

The present non-provisional application claims the benefit of U.S. Provisional Patent Application Ser. No. 61/720,765, filed Oct. 31, 2012, the entire disclosure of which is hereby incorporated by reference.

FIELD OF THE INVENTION

The present disclosure generally relates to digestion of cellulosic biomass solids, and, more specifically, to methods for reducing the viscosity of a phenolics liquid phase comprising lignin that may be obtained in conjunction with hydrothermal digestion of cellulosic biomass solids.

BACKGROUND OF THE INVENTION

A number of substances of commercial significance may be produced from natural sources, including biomass. Cellulosic biomass may be particularly advantageous in this regard due to the versatility of the abundant carbohydrates found therein in various forms. As used herein, the term "cellulosic biomass" refers to a living or recently living biological material that contains cellulose. The lignocellulosic material found in the cell walls of higher plants is the world's largest source of carbohydrates. Materials commonly produced from cellulosic biomass may include, for example, paper and pulpwood via partial digestion, and bioethanol by fermentation.

Plant cell walls are divided into two sections: primary cell walls and secondary cell walls. The primary cell wall provides structural support for expanding cells and contains three major polysaccharides (cellulose, pectin, and hemicellulose) and one group of glycoproteins. The secondary cell wall, which is produced after the cell has finished growing, also contains polysaccharides and is strengthened through polymeric lignin that is covalently crosslinked to hemicellulose. Hemicellulose and pectin are typically found in abundance, but cellulose is the predominant polysaccharide and the most abundant source of carbohydrates. The complex mixture of constituents that is co-present with the cellulose can make its processing difficult, as discussed hereinafter. Lignin, in particular, may be an especially difficult constituent to deal with.

Significant attention has been placed on developing fossil fuel alternatives derived from renewable resources. Cellulosic biomass has garnered particular attention in this regard due to its abundance and the versatility of the various constituents found therein, particularly cellulose and other carbohydrates. Despite promise and intense interest, the development and implementation of bio-based fuel technology has been slow. Existing technologies have heretofore produced fuels having a low energy density (e.g., bioethanol) and/or that are not fully compatible with existing engine designs and transportation infrastructure (e.g., methanol, biodiesel, Fischer-Tropsch diesel, hydrogen, and methane). Moreover, conventional bio-based processes have produced intermediates in dilute aqueous solutions (>50% water by weight) that are difficult to further process. Energy- and cost-efficient processes for processing cellulosic biomass into fuel blends having similar compositions to fossil fuels would be highly desirable to address the foregoing issues and others.

When converting cellulosic biomass into fuel blends and other materials, cellulose and other complex carbohydrates therein can be extracted and transformed into simpler organic molecules, which can be further reformed thereafter. Fermentation is one process whereby complex carbohydrates from cellulosic biomass may be converted into a more usable form. However, fermentation processes are typically slow, require large volume reactors and high dilution conditions, and produce an initial reaction product having a low energy density (ethanol). Digestion is another way in which cellulose and other complex carbohydrates may be converted into a more usable form. Digestion processes can break down cellulose and other complex carbohydrates within cellulosic biomass into simpler, soluble carbohydrates that are suitable for further transformation through downstream reforming reactions. As used herein, the term "soluble carbohydrates" refers to monosaccharides or polysaccharides that become solubilized in a digestion process. Although the underlying chemistry is understood behind digesting cellulose and other complex carbohydrates and further transforming simple carbohydrates into organic compounds reminiscent of those present in fossil fuels, high-yield and energy-efficient digestion processes suitable for converting cellulosic biomass into fuel blends have yet to be developed. In this regard, the most basic requirement associated with converting cellulosic biomass into fuel blends using digestion and other processes is that the energy input needed to bring about the conversion should not be greater than the available energy output of the product fuel blends. This basic requirement leads to a number of secondary issues that collectively present an immense engineering challenge that has not been solved heretofore.

The issues associated with converting cellulosic biomass into fuel blends in an energy- and cost-efficient manner using digestion are not only complex, but they are entirely different than those that are encountered in the digestion processes commonly used in the paper and pulpwood industry. Since the intent of cellulosic biomass digestion in the paper and pulpwood industry is to retain a solid material (e.g., wood pulp), incomplete digestion is usually performed at low temperatures (e.g., less than about 100° C.) for a fairly short period of time. In contrast, digestion processes suitable for converting cellulosic biomass into fuel blends and other materials are ideally configured to maximize yields by solubilizing as much of the original cellulosic biomass charge as possible in a high-throughput manner. Paper and pulpwood digestion processes also typically remove lignin from the raw cellulosic biomass prior to pulp formation. Although digestion processes used in connection with forming fuel blends and other materials may likewise remove lignin prior to digestion, these extra process steps may impact the energy efficiency and cost of the biomass conversion process. The presence of lignin during high-conversion cellulosic biomass digestion may be particularly problematic.

Production of soluble carbohydrates for use in fuel blends and other materials via routine modification of paper and pulpwood digestion processes is not believed to be economically feasible for a number of reasons. Simply running the digestion processes of the paper and pulpwood industry for a longer period of time to produce more soluble carbohydrates is undesirable from a throughput standpoint. Use of digestion promoters such as strong alkalis, strong acids, or sulfites to accelerate the digestion rate can increase process costs and complexity due to post-processing separation steps and the possible need to protect downstream components from these agents. Accelerating the digestion rate by increasing the digestion temperature can actually reduce yields due to thermal degradation of soluble carbohydrates that can occur at elevated digestion temperatures, particularly over extended periods of time. Once produced by digestion, soluble carbohydrates are very reactive and can rapidly degrade to produce caramelans and other heavy ends degradation products, especially under higher temperature conditions, such as above about 150° C. Use of higher digestion temperatures can also be undesirable from an energy efficiency standpoint. Any of these difficulties can defeat the economic viability of fuel blends derived from cellulosic biomass.

One way in which soluble carbohydrates can be protected from thermal degradation is through subjecting them to one or more catalytic reduction reactions, which may include hydrogenation and/or hydrogenolysis reactions. Stabilizing soluble carbohydrates through conducting one or more catalytic reduction reactions may allow digestion of cellulosic biomass to take place at higher temperatures than would otherwise be possible without unduly sacrificing yields. Depending on the reaction conditions and catalyst used, reaction products formed as a result of conducting one or more catalytic reduction reactions on soluble carbohydrates may comprise one or more alcohol functional groups, particularly including triols, diols, monohydric alcohols, and any combination thereof, some of which may also include a residual carbonyl functionality (e.g., an aldehyde or a ketone). Such reaction products are more thermally stable than soluble carbohydrates and may be readily transformable into fuel blends and other materials through conducting one or more downstream reforming reactions. In addition, the foregoing types of reaction products are good solvents in which a hydrothermal digestion may be performed, thereby promoting solubilization of soluble carbohydrates as their reaction products. Although a digestion solvent may also promote solubilization of lignin, this material may still be difficult to effectively process due to its poor solubility and precipitation propensity.

A particularly effective manner in which soluble carbohydrates may be formed and converted into more stable compounds is through conducting the hydrothermal digestion of cellulosic biomass in the presence of molecular hydrogen and a slurry catalyst capable of activating the molecular hydrogen (also referred to herein as a "hydrogen-activating catalyst"). That is, in such approaches (termed "in situ catalytic reduction reaction processes" herein), the hydrothermal digestion of cellulosic biomass and the catalytic reduction of soluble carbohydrates produced therefrom may take place in the same vessel. As used herein, the term "slurry catalyst" will refer to a catalyst comprising fluidly mobile catalyst particles that can be at least partially suspended in a fluid phase via gas flow, liquid flow, mechanical agitation, or any combination thereof. If the slurry catalyst is sufficiently well distributed in the cellulosic biomass, soluble carbohydrates formed during hydrothermal digestion may be intercepted and converted into more stable compounds before they have had an opportunity to significantly degrade, even under thermal conditions that otherwise promote their degradation. Without adequate catalyst distribution being realized, soluble carbohydrates produced by in situ catalytic reduction reaction processes may still degrade before they have had an opportunity to encounter a catalytic site and undergo a stabilizing reaction. In situ catalytic reduction reaction processes may also be particularly advantageous from an energy efficiency standpoint, since hydrothermal digestion of cellulosic biomass is an endothermic process, whereas catalytic reduction reactions are exothermic. Thus, the excess heat generated by the in situ catalytic reduction reaction(s) may be utilized to drive the hydrothermal digestion with little opportunity for heat transfer loss to occur, thereby lowering the amount of additional heat energy input needed to conduct the digestion.

Another issue associated with the processing of cellulosic biomass into fuel blends and other materials is created by the need for high conversion percentages of a cellulosic biomass charge into soluble carbohydrates. Specifically, as cellulosic biomass solids are digested, their size gradually decreases to the point that they can become fluidly mobile. As used herein, cellulosic biomass solids that are fluidly mobile, particularly cellulosic biomass solids that are about 3 mm in size or less, will be referred to as "cellulosic biomass fines." Cellulosic biomass fines can be transported out of a digestion zone of a system for converting cellulosic biomass and into one or more zones where solids are unwanted and can be detrimental. For example, cellulosic biomass fines have the potential to plug catalyst beds, transfer lines, valving, and the like. Furthermore, although small in size, cellulosic biomass fines may represent a non-trivial fraction of the cellulosic biomass charge, and if they are not further converted into soluble carbohydrates, the ability to attain a satisfactory conversion percentage may be impacted. Since the digestion processes of the paper and pulpwood industry are run at relatively low cellulosic biomass conversion percentages, smaller amounts of cellulosic biomass fines are believed to be generated and have a lesser impact on those digestion processes.

In addition to the desired carbohydrates, other substances may be present within cellulosic biomass that can be especially problematic to deal with in an energy- and cost-efficient manner. Sulfur- and/or nitrogen-containing amino acids or other catalyst poisons may be present in cellulosic biomass. If not removed, these catalyst poisons can impact the catalytic reduction reaction(s) used to stabilize soluble carbohydrates, thereby resulting in process downtime for catalyst regeneration and/or replacement and reducing the overall energy efficiency when restarting the process. This issue is particularly significant for in situ catalytic reduction reaction processes, where there is minimal opportunity to address the presence of catalyst poisons, at least without significantly increasing process complexity and cost. As mentioned above, lignin can also be particularly problematic to deal with if it is not removed prior to beginning digestion. During cellulosic biomass processing, the significant quantities of lignin present in cellulosic biomass may lead to fouling of processing equipment, potentially leading to costly system down time. The significant lignin quantities can also lead to realization of a relatively low conversion of the cellulosic biomass into useable substances per unit weight of feedstock.

As evidenced by the foregoing, the efficient conversion of cellulosic biomass into fuel blends and other materials is a complex problem that presents immense engineering challenges. The present disclosure addresses these challenges and provides related advantages as well.

SUMMARY OF THE INVENTION

The present disclosure generally relates to digestion of cellulosic biomass solids, and, more specifically, to methods for reducing the viscosity of a phenolics liquid phase comprising lignin that may be obtained in conjunction with hydrothermal digestion of cellulosic biomass solids.

In some embodiments, the present disclosure provides methods comprising: providing cellulosic biomass solids in the presence of a digestion solvent, molecular hydrogen, and a slurry catalyst capable of activating molecular hydrogen; at least partially converting the cellulosic biomass solids into a phenolics liquid phase comprising lignin, an aqueous phase comprising an alcoholic component derived from the cellulosic biomass solids, and an optional light organics phase; wherein at least a portion of the slurry catalyst accumulates in the phenolics liquid phase as it forms; and reducing the viscosity of the phenolics liquid phase.

In some embodiments, the present disclosure provides methods comprising: providing cellulosic biomass solids in the presence of a digestion solvent, molecular hydrogen, and a slurry catalyst capable of activating molecular hydrogen; heating the cellulosic biomass solids to a first temperature and at least partially converting the cellulosic biomass solids into a phenolics liquid phase comprising lignin, an aqueous phase comprising an alcoholic component derived from the cellulosic biomass solids, and an optional light organics phase; wherein at least a portion of the slurry catalyst accumulates in the phenolics liquid phase as it forms; heating the phenolics liquid phase in the presence of molecular hydrogen to a second temperature that is higher than the first temperature, thereby reducing the viscosity of the phenolics liquid phase; and after reducing the viscosity of the phenolics liquid phase, separating the slurry catalyst therefrom.

In some embodiments, the present disclosure provides biomass conversion systems comprising: a hydrothermal digestion unit; a first fluid conduit configured to remove a first fluid from the hydrothermal digestion unit and return the first fluid thereto; and a viscosity measurement device within the hydrothermal digestion unit or in flow communication with the hydrothermal digestion unit.

The features and advantages of the present disclosure will be readily apparent to one having ordinary skill in the art upon a reading of the description of the embodiments that follows.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

Figure 1:
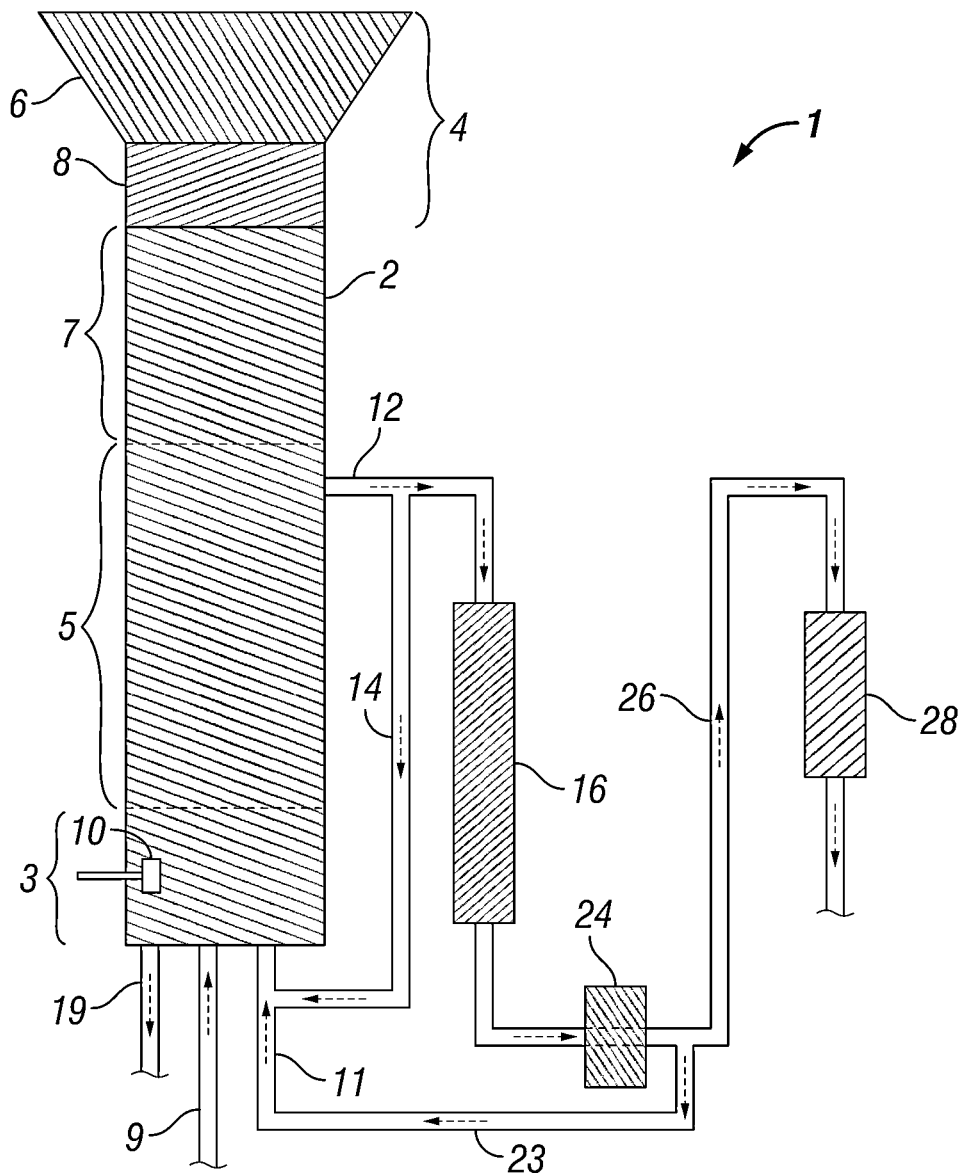
FIGS. 1 and 2 show schematics of illustrative biomass conversion systems in which a phenolics liquid phase may form and be further processed.

The present disclosure generally relates to digestion of cellulosic biomass solids, and, more specifically, to methods for reducing the viscosity of a phenolics liquid phase comprising lignin that may be obtained in conjunction with hydrothermal digestion of cellulosic biomass solids.

In the embodiments described herein, the digestion rate of cellulosic biomass solids may be accelerated in the presence of a digestion solvent. In some instances, the digestion solvent may be maintained at elevated pressures that keep the digestion solvent in a liquid state when raised above its normal boiling point. Although the more rapid digestion rate of cellulosic biomass solids under elevated temperature and pressure conditions may be desirable from a throughput standpoint, soluble carbohydrates may be susceptible to degradation at elevated temperatures, as discussed above. As further discussed above, one approach for addressing the degradation of soluble carbohydrates during hydrothermal digestion is to conduct an in situ catalytic reduction reaction process so as to convert the soluble carbohydrates into more stable compounds as soon as possible after their formation.

Although digesting cellulosic biomass solids by an in situ catalytic reduction reaction process may be particularly advantageous for at least the reasons noted above, successfully executing such a coupled approach may be problematic in other aspects. One significant issue that may be encountered is that of adequate catalyst distribution within the digesting cellulosic biomass solids, since insufficient catalyst distribution can result in poor stabilization of soluble carbohydrates. Although a catalyst might be pre-mixed or co-blended with cellulosic biomass solids and then subjected to an in situ catalytic reduction reaction process, these solutions may still produce inadequate catalyst distribution and present significant engineering challenges that markedly increase process complexity and operational costs. In contrast, the present inventors discovered a relatively simple and low cost engineering solution whereby a slurry catalyst may be effectively distributed within cellulosic biomass solids using fluid flow to convey the slurry catalyst particulates into the interstitial spaces within a charge of cellulosic biomass solids. Although the slurry catalyst may be conveyed into the cellulosic biomass solids using fluid flow from any direction, the present inventors consider it most effective to have at least a portion of the slurry catalyst be conveyed by upwardly directed fluid flow, or at least that upwardly directed fluid flow be present, since such fluid flow may promote expansion of the cellulosic biomass solids and disfavor gravity-induced compaction that occurs during their addition and digestion. In addition, when upwardly directed fluid flow is present, there may be a reduced need to utilize mechanical stirring or like mechanical agitation techniques that might otherwise be needed to obtain an adequate catalyst distribution.

Suitable techniques for using fluid flow to distribute a slurry catalyst within cellulosic biomass solids are described in commonly owned U.S. Patent Applications 61/665,727 and 61/665,627, each filed on Jun. 28, 2012 (PCT/US2013/048239 and PCT/US2013/048248) and incorporated herein by reference in its entirety. As described therein, cellulosic biomass solids may have at least some innate propensity for retaining a slurry catalyst being conveyed by fluid flow, and at least a portion of the cellulosic biomass solids may be sized to better promote such retention. In addition, using fluid flow, particularly upwardly directed fluid flow, to force a slurry catalyst to actively circulate through a charge of digesting cellulosic biomass solids may ensure adequate slurry catalyst distribution as well as advantageously reduce thermal gradients that may occur during hydrothermal digestion. As a further advantage, active circulation of the slurry catalyst may address the problem created by the production of cellulosic biomass fines, since they may be co-circulated with the slurry catalyst for continued digestion to take place.

As alluded to above, lignin can be an especially problematic component of cellulosic biomass solids, whose presence during hydrothermal digestion may need to be addressed in some manner, particularly as the lignin content builds. Lignin buildup may be especially problematic in continuously operating processes in which cellulosic biomass solids are supplied and digested on an ongoing basis. During hydrothermal digestion, lignin may either remain undissolved or precipitate from the digestion solvent, either case presenting opportunities for surface fouling. In further regard to the lignin disposition, the present inventors expected that lignin freed from cellulosic biomass solids would reside predominantly in the same location as an alcoholic component being produced by catalytic reduction of soluble carbohydrates. That is, the inventors expected that the lignin and the alcoholic component would be located in the same phase of the digestion medium before the lignin eventually precipitated.

Surprisingly, while digesting cellulosic biomass solids by an in situ catalytic reduction reaction process in the presence of a slurry catalyst, where the cellulosic biomass solids were supplied on an ongoing basis, the present inventors discovered that the lignin predominantly separated as a phenolics liquid phase that was neither fully dissolved nor fully precipitated, but instead formed as a discrete liquid phase that was highly viscous and hydrophobic. In many cases, the phenolics liquid phase was below an aqueous phase containing an alcoholic component derived from the cellulosic biomass solids. Depending on the ratio of water and organic solvent in the digestion solvent, rates of fluid flow, catalyst identity, reaction times and temperatures, and the like, a light organics phase was also sometimes observed, typically above the aqueous phase, where the components of the light organics phase were also derived, at least in part, from the cellulosic materials in the biomass. Components present in the light organics phase included, for example, the desired alcoholic component, including $C_4$ or greater alcohols, and self-condensation products, such as those obtained by the acid-catalyzed Aldol reaction. Formation of the phenolics liquid phase was particularly surprising, since batch processing using only a single addition of cellulosic biomass solids routinely produced only a two-phase mixture of light organics and an aqueous phase containing an alcoholic component. Similar results were obtained using isolated carbohydrates or cellulose under test reaction conditions. Thus, in the presence of excessive lignin quantities or components derived therefrom, at least a portion of the desired alcoholic component derived from the cellulosic biomass solids could either be located in the middle aqueous phase of a three-phase mixture or in the upper phase of a two-phase mixture. This phase behavior alone represented a significant engineering challenge, since a system for further reforming the alcoholic component in the aqueous phases would need to be configured to withdraw the correct phase depending on the particular conditions present during hydrothermal digestion. As described herein, it was ultimately found that further processing of the phenolics liquid phase could be performed with the phenolics liquid phase separated from the aqueous phase or with the two phases combined together. It was also discovered by the present inventors that further processing of the phenolics liquid phase may also be advantageous and contribute to the success of the biomass conversion process. More particularly, further processing of the phenolics liquid phase may comprise, at least in part, reducing the viscosity of this phase, the benefits of which are described hereinafter.

The present inventors found that formation of the phenolics liquid phase significantly impacted the ability to successfully conduct an in situ catalytic reduction reaction process, since the phenolics liquid phase increased the difficulty of distributing the slurry catalyst in the cellulosic biomass solids. Specifically, the inventors discovered that the slurry catalyst is readily wetted by the phenolics liquid phase and accumulates therein over time, thereby making the catalyst less available for distribution within the cellulosic biomass solids. Moreover, once the slurry catalyst has been wetted and accumulates in the phenolics liquid phase, the high density and viscosity of this phase may make it difficult to liberate the slurry catalyst therefrom and redistribute it in the cellulosic biomass solids using fluid flow. If enough slurry catalyst becomes unavailable for ready distribution in the cellulosic biomass solids, poor stabilization of soluble carbohydrates as an alcoholic component may occur.

Even more significantly, the inventors found that contact of the phenolics liquid phase with the slurry catalyst was exceedingly detrimental for catalyst life. Without being bound by any theory or mechanism, it is believed that the highly viscous phenolics liquid phase may coat the slurry catalyst and plug pore space therein, thereby blocking at least a portion of the catalytic sites on the slurry catalyst. Furthermore, the inventors found that the high viscosity of the phenolics liquid phase made it difficult to separate the slurry catalyst from this phase. Thus, developing an effective way of removing the slurry catalyst from the phenolics liquid phase, returning the slurry catalyst to the cellulosic biomass solids, and maintaining the catalyst's life represented significant problems to be solved.

The present inventors discovered that the viscosity of the phenolics liquid phase was a significant factor leading to its detrimental effects noted above. As described herein, the inventors found that by reducing the viscosity of the phenolics liquid phase, the slurry catalyst could be more readily removed therefrom and then redistributed in the cellulosic biomass solids. Moreover, viscosity reduction represents a facile means to monitor and control the biomass conversion process (e.g., in a feedback loop), as discussed in more detail below. For example, if the measured viscosity is above a threshold level, the biomass conversion process may be altered to affect a further reduction in the viscosity and return it to a desired level.

Any suitable deviscosification technique can be used to affect a beneficial reduction in viscosity of the phenolics liquid phase, although the inventors found that thermal treatment of the phenolics liquid phase in the presence of molecular hydrogen (also referred to herein as hydrotreating) may afford particular advantages. Although the viscosity of the phenolics liquid phase may be lowered, at least to some degree, simply by increasing its temperature, hydrotreating processes conducted at higher temperatures may result in a chemical transformation of the lignin and be particularly beneficial, as discussed in more detail below. More specifically, in some embodiments, the phenolics liquid phase may be heated to a temperature that results in at least partial depolymerization of the lignin, thereby producing a beneficial reduction in viscosity. Similar benefits of viscosity reduction may be realized by treating the phenolics liquid phase with a base to at least partially hydrolyze the lignin polymer.

By reducing the viscosity of the phenolics liquid phase, the inventors found that the slurry catalyst was much more readily separable therefrom by liquid-solid separation techniques (e.g., filtration, gravity-induced settling, and the like). Once separated, the slurry catalyst can be returned to the cellulosic biomass solids or regenerated, if necessary. Moreover, the inventors found that after reducing the viscosity of the phenolics liquid phase, the slurry catalyst typically exhibited an improved life compared to that seen otherwise. Remaining unbound by any theory or mechanism, it is believed that the phenolics liquid phase coating and/or infiltrating the slurry catalyst may be readily removed from the catalyst particulates once its viscosity has been reduced, thereby re-exposing at least some of the catalytic sites.

As alluded to above, the inventors found that thermal deviscosification of the phenolics liquid phase in the presence of molecular hydrogen (i.e., hydrotreating) produced particular advantages during the processing of cellulosic biomass solids. Specifically, the inventors found that by heating the phenolics liquid phase to a temperature of at least about 250° C. in the presence of molecular hydrogen and a catalyst capable of activating molecular hydrogen, the lignin was sufficiently depolymerized to realize the foregoing advantages. Thermal deviscosification of the phenolics liquid phase may beneficially make use of the slurry catalyst that is already accumulated in this phase. Furthermore, thermal treatment of the phenolics liquid phase in the presence of molecular hydrogen may at least partially regenerate the slurry catalyst accumulated therein, since such conditions may be used to regenerate catalysts that are capable of activating molecular hydrogen. Thus, hydrotreating may advantageously result in dual deviscosification and regeneration of the accumulated slurry catalyst.

As also alluded to above, reducing the viscosity of the phenolics liquid phase may be used as a ready means of process monitoring and control when digesting cellulosic biomass solids, particularly in processes where the lignin content builds over time. Viscosity is a physical parameter that may be readily measured and correlated to an amount of lignin present in a biomass conversion process, but without having to directly assay the lignin concentration by spectroscopic or wet chemical analyses, which may be time consuming, complicated to perform, and sensitive to the presence of interferents. By monitoring the viscosity of the phenolics liquid phase, one may determine when excessive lignin quantities have been produced and processing of this phase is desirable to affect a reduction in its viscosity. Further, by monitoring the viscosity of the phenolics liquid phase in real-time or near real-time while viscosity reduction is taking place, one may determine when a desired degree of viscosity reduction has been achieved such that at least some of the foregoing benefits can be realized. That is, in some embodiments, monitoring the viscosity of the phenolics liquid phase may be used in a feedback loop for affecting better control of the biomass conversion process.

As a further benefit of reducing the viscosity of the phenolics liquid phase by thermal depolymerization of the lignin therein, the inventors found that significant quantities of methanol were generated upon heating this phase to a temperature of at least about 250° C. Without being bound by any theory or mechanism, it is believed that the methanol formation occurred due to cleavage of at least some of the phenolic methyl ethers on the lignin polymer backbone. Formation of the methanol represents a significant process advantage, since it comprises a feedstock material that may be transformed into fuel blends and other materials through downstream reforming reactions like those used for further reforming the alcoholic component. Thus, methanol generated from the phenolics liquid phase may be combined for further reforming with the alcoholic component generated by catalytic reduction of soluble carbohydrates. Optionally, the methanol may be processed separately or otherwise utilized in some manner. In any event, formation of the methanol advantageously allows a greater weight percentage of the original cellulosic biomass solids to be transformed into useful material.

In addition to methanol, phenolic compounds and other small molecules produced from lignin depolymerization can also be combined with the alcoholic component generated from the cellulosic biomass solids, if desired. Optionally, the phenolic compounds or other small molecules can be processed separately from the alcoholic component. Processing the phenolic compounds and other small molecules in the foregoing manner may again increase the utilization of the starting cellulosic biomass solids and allow custom fuel blends to be made.

Unless otherwise specified, it is to be understood that use of the terms "biomass" or "cellulosic biomass" in the description herein refers to "cellulosic biomass solids." Solids may be in any size, shape, or form. The cellulosic biomass solids may be natively present in any of these solid sizes, shapes, or forms, or they may be further processed prior to hydrothermal digestion. In some embodiments, the cellulosic biomass solids may be chopped, ground, shredded, pulverized, and the like to produce a desired size prior to hydrothermal digestion. In some or other embodiments, the cellulosic biomass solids may be washed (e.g., with water, an acid, a base, combinations thereof, and the like) prior to hydrothermal digestion taking place.

In practicing the present embodiments, any type of suitable cellulosic biomass source may be used. Suitable cellulosic biomass sources may include, for example, forestry residues, agricultural residues, herbaceous material, municipal solid wastes, waste and recycled paper, pulp and paper mill residues, and any combination thereof. Thus, in some embodiments, a suitable cellulosic biomass may include, for example, corn stover, straw, bagasse, miscanthus, sorghum residue, switch grass, bamboo, water hyacinth, hardwood, hardwood chips, hardwood pulp, softwood, softwood chips, softwood pulp, and any combination thereof. Leaves, roots, seeds, stalks, husks, and the like may be used as a source of the cellulosic biomass. Common sources of cellulosic biomass may include, for example, agricultural wastes (e.g., corn stalks, straw, seed hulls, sugarcane leavings, nut shells, and the like), wood materials (e.g., wood or bark, sawdust, timber slash, mill scrap, and the like), municipal waste (e.g., waste paper, yard clippings or debris, and the like), and energy crops (e.g., poplars, willows, switch grass, alfalfa, prairie bluestream, corn, soybeans, and the like). The cellulosic biomass may be chosen based upon considerations such as, for example, cellulose and/or hemicellulose content, lignin content, growing time/season, growing location/transportation cost, growing costs, harvesting costs, and the like.

Illustrative carbohydrates that may be present in cellulosic biomass solids include, for example, sugars, sugar alcohols, celluloses, lignocelluloses, hemicelluloses, and any combination thereof. Once soluble carbohydrates have been produced through hydrothermal digestion according to the embodiments described herein, the soluble carbohydrates may be transformed into a more stable reaction product comprising an alcoholic component, which may comprise a monohydric alcohol, a glycol, a triol, or any combination thereof in various embodiments. As used herein, the term "glycol" will refer to compounds containing two alcohol functional groups, two alcohol functional groups and a carbonyl functionality, or any combination thereof. As used herein, the term "carbonyl functionality" will refer to an aldehyde functionality or a ketone functionality. In some embodiments, a glycol may comprise a significant fraction of the reaction product. Although a glycol may comprise a significant fraction of the reaction product, it is to be recognized that other alcohols, including triols and monohydric alcohols, for example, may also be present. Further, any of these alcohols may further include a carbonyl functionality. As used herein, the term "triol" will refer to compounds containing three alcohol functional groups, three alcohol functional groups and a carbonyl functionality, and any combination thereof. As used herein, the term "monohydric alcohol" will refer to compounds containing one alcohol functional group, one alcohol functional group and a carbonyl functionality, and any combination thereof.

As used herein, the term "phenolics liquid phase" will refer to a fluid phase comprising liquefied lignin. In some embodiments, the phenolics liquid phase may be more dense than water, but it may also be less dense than water depending on lignin concentrations and the presence of other components, for example.

As used herein, the term "alcoholic component" will refer to a monohydric alcohol, glycol, triol, or any combination thereof that is formed from a catalytic reduction reaction of soluble carbohydrates derived from cellulosic biomass solids.

As used herein, the term "light organics phase" will refer to a fluid phase that is typically less dense than water and comprises an organic compound. The organic compound may include at least a portion of the alcoholic component formed via catalytic reduction of soluble carbohydrates, which may include $C_4$ or greater alcohols and self-condensation products thereof.

As used herein, the phrases "at least partially depolymerize" and "depolymerize at least a portion of" and grammatical equivalents thereof will be used synonymously with one another.

In some embodiments, methods described herein can comprise: providing cellulosic biomass solids in the presence of a digestion solvent, molecular hydrogen, and a slurry catalyst capable of activating molecular hydrogen; at least partially converting the cellulosic biomass solids into a phenolics liquid phase comprising lignin, an aqueous phase comprising an alcoholic component derived from the cellulosic biomass solids, and an optional light organics phase; wherein at least a portion of the slurry catalyst accumulates in the phenolics liquid phase as it forms; and reducing the viscosity of the phenolics liquid phase.

In some embodiments, the alcoholic component may be formed by a catalytic reduction reaction of soluble carbohydrates, where the soluble carbohydrates are derived from the cellulosic biomass solids. In some embodiments, the alcoholic component may comprise a monohydric alcohol, a glycol, a triol, or any combination thereof. In some embodiments, the alcoholic component may comprise a glycol. Cellulosic biomass contains approximately 50% water by weight, and approximately 30% of the dry portion comprises lignin biopolymer. Accordingly, cellulosic biomass solids contain up to about 35 percent by weight cellulosic material (70% cellulosic material by weight on a dry basis) that can be converted into soluble carbohydrates and products derived therefrom, including glycols. In some embodiments, at least about 5 percent by weight of the cellulosic biomass solids may be converted into a glycol. In other embodiments, at least about 10 percent by weight of the cellulosic biomass solids may be converted into a glycol. In some embodiments, between about 5% and about 35% of the cellulosic biomass solids by weight may be converted into a glycol, or between about 10% and about 30% of the cellulosic biomass solids by weight, or between about 5% and about 25% of the cellulosic biomass solids by weight, or between about 5% and about 20% of the cellulosic biomass solids by weight, or between about 5% and about 15% of the cellulosic biomass solids by weight, or between about 10% and about 25% of the cellulosic biomass solids by weight, or between about 10% and about 20% of the cellulosic biomass solids by weight, or between about 10% and about 15% of the cellulosic biomass solids by weight Separation and recycle of the glycol may be used to increase the glycol content of the digestion solvent. For example, in some embodiments, the digestion solvent may comprise between about 10% glycol and about 90% glycol by weight.

In various embodiments, soluble carbohydrates produced from cellulosic biomass solids may be converted into a reaction product comprising a glycol via a catalytic reduction reaction mediated by a catalyst that is capable of activating molecular hydrogen (referred herein as hydrocatalytic catalyst). As described in commonly owned U.S. Patent Applications 61/720,704 and 61/720,714, entitled "Methods for Production and Processing of a Glycol Reaction Product Obtained from Hydrothermal Digestion of Cellulosic Biomass Solids" and "Methods for Conversion of a Glycol Reaction Product Obtained from Hydrothermal Digestion of Cellulosic Biomass Solids Into a Dry Monohydric Alcohol Feed," each filed on Oct. 31, 2012 and incorporated herein by reference in its entirety, production of glycols may present several process advantages, particularly with regard to downstream reforming reactions. In other aspects, formation of monohydric alcohols may be more desirable. In some embodiments, the catalytic reduction reaction may take place at a temperature ranging between about 110° C. and about 300° C., or between about 170° C. and about 300° C., or between about 180° C. and about 290° C., or between about 150° C. and about 250° C. In some embodiments, the catalytic reduction reaction may take place at a temperature that is insufficient to at least partially depolymerize the lignin present in the phenolics liquid phase. However, in other embodiments, at least partial depolymerization of the lignin may take place while conducting the catalytic reduction reaction. In some embodiments, the catalytic reduction reaction may take place at a pH ranging between about 7 and about 13, or between about 10 and about 12. In other embodiments, the catalytic reduction reaction may take place under acidic conditions, such as a pH of about 5 to about 7. In some embodiments, the catalytic reduction reaction may be conducted in the presence of a slurry catalyst under a hydrogen partial pressure ranging between about 1 bar (absolute) and about 150 bar, or between about 15 bar and about 140 bar, or between about 30 bar and about 130 bar, or between about 50 bar and about 110 bar. As described above, slurry catalysts may be particularly desirable for use in conjunction with in situ catalytic reduction reaction processes.

In various embodiments, the digestion solvent in which soluble carbohydrates are formed from cellulosic biomass solids and subsequently converted into the alcoholic component may comprise an organic solvent. In various embodiments, the digestion solvent may comprise an organic solvent and water. Although any organic solvent that is at least partially miscible with water may be used in the digestion solvent, particularly advantageous organic solvents are those that can be directly converted into fuel blends and other materials without being separated from the alcoholic component. That is, particularly advantageous organic solvents are those that may be co-processed during downstream reforming reactions with the alcoholic component being produced. Suitable organic solvents in this regard may include, for example, ethanol, ethylene glycol, propylene glycol, glycerol, and any combination thereof.

Even more desirably, in some embodiments, the organic solvent may comprise a glycol or be transformable to a glycol under the conditions used for stabilizing soluble carbohydrates. In some embodiments, the digestion solvent may comprise water and glycerol. Glycerol may be a particularly advantageous organic solvent in this regard, since it comprises a good solvent for soluble carbohydrates and readily undergoes a catalytic reduction reaction to form a glycol in the presence of molecular hydrogen and a suitable catalyst. In addition, glycerol is inexpensive and is readily available from natural sources. Thus, in some embodiments, the methods described herein may comprise co-processing a glycol formed from an organic solvent, particularly glycerol, in conjunction with a glycol formed from soluble carbohydrates.

In some embodiments, the digestion solvent may further comprise a small amount of a monohydric alcohol. The presence of at least some monohydric alcohols in the digestion solvent may desirably enhance the hydrothermal digestion and/or the catalytic reduction reactions being conducted therein. For example, inclusion of about 1% to about 5% by weight monohydric alcohols in the digestion solvent may desirably maintain catalyst activity due to a surface cleaning effect. At higher concentrations of monohydric alcohols, bulk solvent effects may begin to predominate. In some embodiments, the digestion solvent may comprise about 10 wt. % or less monohydric alcohols, with the balance of the digestion solvent comprising water and another organic solvent. In some embodiments, the digestion solvent may comprise about 5 wt. % or less monohydric alcohols, or about 4% or less monohydric alcohols, or about 3% or less monohydric alcohols, or about 2% or less monohydric alcohols, or about 1% or less monohydric alcohols. Monohydric alcohols present in the digestion solvent may arise from any source. In some embodiments, the monohydric alcohols may be formed as a co-product with the alcoholic component being formed by the catalytic reduction reaction. In some or other embodiments, the monohydric alcohols may be formed by a subsequent catalytic reduction of the initially produced alcoholic component and thereafter returned to the cellulosic biomass solids. In still other embodiments, the monohydric alcohols may be sourced from an external feed that is in flow communication with the cellulosic biomass solids.

In some embodiments, the digestion solvent may comprise between about 1% water and about 99% water, with the organic solvent comprising the balance of the digestion solvent composition. Although higher percentages of water may be more favorable from an environmental standpoint, higher quantities of organic solvent may more effectively promote hydrothermal digestion due to the organic solvent's greater propensity to solubilize carbohydrates and promote catalytic reduction of the soluble carbohydrates. In some embodiments, the digestion solvent may comprise about 90% or less water by weight. In other embodiments, the digestion solvent may comprise about 80% or less water by weight, or about 70% or less water by weight, or about 60% or less water by weight, or about 50% or less water by weight, or about 40% or less water by weight, or about 30% or less water by weight, or about 20% or less water by weight, or about 10% or less water by weight, or about 5% or less water by weight.

In some embodiments, methods described herein may further comprise measuring the viscosity of the phenolics liquid phase with a viscosity measurement device. Any suitable technique or device for measuring viscosity may be used in conjunction with the methods described herein. Suitable instrumental techniques for measuring the viscosity of the phenolics liquid phase may include, for example, rheometry and viscometry. Viscometers suitable for practicing the embodiments described herein are not believed to be particularly limited and may include, for example, U-tube viscometers and capillary viscometers (including Ostwald viscometers and Ubbelohde viscometers), falling sphere viscometers, falling piston viscometers, oscillating piston viscometers, vibrational viscometers, rotational viscometers (including electromagnetically spinning sphere viscometers, and Stabinger viscometers), bubble viscometers, micro-slit viscometers, rolling ball viscometers, electromagnetic viscometers, Ford viscosity cups, and the like. Rheometers suitable for practicing the embodiments described herein are not believed to be particularly limited and may include, for example, shear rheometers (including pipe rheometers, capillary rheometers, cone and plate rheometers, linear shear rheometers, and the like) and extensional rheometers (including capillary breakup rheometers, opposed jet rheometers, filament stretching rheometers, constant-length rheometers, acoustic rheometers, falling plate rheometers, and the like). Selection of a suitable viscometer or rheometer for practicing the embodiments described herein may be determined, at least in part, by the location at which the viscosity is being measured and well as the apparent viscosity. Given the benefit of the present disclosure, one of ordinary skill in the art will be able to select a suitable viscometer or rheometer for practicing the embodiments described herein.

In some embodiments, measuring the viscosity of the phenolics liquid phase may take place in the location in which it is being formed (e.g., in a hydrothermal digestion unit in the presence of cellulosic biomass solids). In other embodiments, measuring the viscosity of the phenolics liquid phase may take place in a location separate from that of its formation. For example, in some embodiments, the phenolics liquid phase may be formed in a hydrothermal digestion unit and conveyed to a separate location where its viscosity is measured and reduced as described herein. In some embodiments, the viscosity of the phenolics liquid phase may be measured when it is combined with the aqueous phase. In other embodiments, the viscosity of the phenolics liquid phase may be measured when this phase is maintained separately.

In some embodiments, reducing the viscosity of the phenolics liquid phase and measuring the viscosity of this phase may take place at the same time. Accordingly, in such embodiments, lignin deviscosification may be used as a means of real-time process monitoring and control. For example, in some embodiments, the viscosity measurement may provide feedback to a biomass conversion process as a means of thermal control. Specifically, the viscosity measurement device may be communicatively coupled to a temperature controller, which may be adjusted in response to the measured viscosity to increase or decrease the degree of lignin depolymerization in the phenolics liquid phase, if needed. Related means of process control can also be realized, even if the lignin deviscosification and viscosity measurement thereof are not being conducted at the same time or in the same location. In some or other embodiments, measuring the viscosity of the phenolics liquid phase may take place before and/or after its deviscosification. In some embodiments, the phenolics liquids phase may be in the process of being formed and deviscosified while the viscosity measurement is being made (i.e., during the digestion of cellulosic biomass solids). In other embodiments, measuring the viscosity may be conducted a different time and/or a different location than that at which the phenolics liquids phase is being formed and deviscosified. For example, in some embodiments, the phenolics liquid phase may be transferred to a location in which deviscosification is not taking place and/or a sample of the phenolics liquid phase may be withdrawn for viscosity measurement. Likewise, in still other embodiments, formation of the phenolics liquid phase may take place in a different location than that at which deviscosification and/or measurement of the viscosity takes place.

In some embodiments, reducing the viscosity of the phenolics liquid phase may take place until a pre-determined viscosity has been attained. For example, in some embodiments, the viscosity may be reduced to under about 1000 cP. In some embodiments, reducing the viscosity of the phenolics liquid phase may take place until the viscosity of the phenolics liquid phase has been reduced by a fixed percentage. In other embodiments, reducing the viscosity of the phenolics liquid phase may take place until the viscosity has been decreased sufficiently for the slurry catalyst to be separated therefrom. In still other embodiments, reducing the viscosity of the phenolics liquid phase may take place until the viscosity has decreased sufficiently for the phenolics liquid phase to be transferred or otherwise processed. The choice of a suitable viscosity for the phenolics liquid phase may be a matter of operational constraints and may not be the same in all cases. Given the benefit of the present disclosure, one of ordinary skill in the art will be able to determine a viscosity appropriate for use in a given application.

In some embodiments, reducing the viscosity of the phenolics liquid phase may comprise reacting the phenolics liquid phase with a base. Reacting the phenolics liquid phase with a base can result in at least partial hydrolysis (depolymerization) of the lignin polymer therein. In some embodiments, the base may be reacted with the phenolics liquid phase at room temperature (e.g., about 25° C. or below). In other embodiments, the phenolics liquid phase may be reacted with the base while being heated (e.g., above about 25° C.).

In some embodiments, reducing the viscosity of the phenolics liquid phase may comprise heating the phenolics liquid phase in the presence of molecular hydrogen and the slurry catalyst. In some embodiments, the phenolics liquid phase may be heated to a temperature that is sufficient to at least partially depolymerize the lignin therein. In some embodiments, the cellulosic biomass solids may be heated to a first temperature to form the phenolics liquid phase and the aqueous phase, and the phenolics liquid phase may then be heated to a second temperature to at least partially depolymerize the lignin therein. In some embodiments, the first temperature may be lower than the second temperature. In some embodiments, the first temperature may be insufficient to at least partially depolymerize the lignin. That is, in such embodiments, the phenolics liquid phase may be formed at a first temperature without substantially depolymerizing the lignin, and the phenolics liquid phase may then be heated to the second temperature that at least partially depolymerizes the lignin. In alternative embodiments, both the first and second temperatures may be sufficient to at least partially depolymerize the lignin. When the present methods are practiced in such a manner, depolymerization of the lignin may occur while forming the alcoholic component.

In some embodiments, heating the cellulosic biomass solids to form the phenolics liquid phase may take place at a temperature of about 250° C. or lower. In some embodiments, heating to form the phenolics liquid phase may take place at a temperature of about 240° C. or lower, or about 230° C. or lower, or about 220° C. or lower, or about 210° C. or lower, or about 200° C. or lower. In some embodiments, heating to form the phenolics liquid phase may take place at a temperature ranging between about 150° C. and about 250° C. In some embodiments, heating to form the phenolics liquid phase may take place at a temperature ranging between about 160° C. and about 240° C., or between about 170° C. and about 230° C., or between about 180° C. and about 220° C., or between about 200° C. and about 250° C., or between about 200° C. and about 240° C., or between about 200° C. and about 230° C., or between about 210° C. and about 250° C., or between about 210° C. and about 240° C., or between about 210° C. and about 230° C., or between about 220° C. and about 250° C., or between about 220° C. and about 240° C.

In some embodiments, the phenolics liquid phase may be heated to a temperature sufficient to at least partially depolymerize the lignin therein. In some embodiments, the phenolics liquid phase may be heated to a temperature of at least about 250° C. In some embodiments, the phenolics liquid phase may be heated to a temperature of at least about 270° C., or at least about 275° C., or at least about 280° C., or at least about 285° C., or at least about 290° C., or at least about 295° C., or at least about 300° C. In some embodiments, the phenolics liquid phase may be heated to a temperature ranging between about 250° C. and about 330° C., or between about 260° C. and about 320° C., or between about 270° C. and about 300° C., or between about 250° C. and about 290° C., or between about 270° C. and about 290° C.

The lignin within the phenolics liquid phase need not necessarily be completely depolymerized to achieve a beneficial reduction in viscosity. Even small reductions in the viscosity of the phenolics liquid phase may be beneficial in improving catalyst separability and lifetime, as well as facilitating the conveyance of this phase. In some embodiments, the viscosity of the phenolics liquid phase may be reduced by at most about 20%. In some or other embodiments, the viscosity of the phenolics liquid phase may be reduced by at most about 15%, or by at most about 10%, or by at most about 5%. Factors that may determine a degree to which the phenolics liquid phase needs to have its viscosity reduced may include, for example, the starting viscosity of the phenolics liquid phase, the ease of separation of the slurry catalyst therefrom, and the catalyst lifetime and activity after viscosity reduction.

As discussed above, while reducing the viscosity of the phenolics liquid phase by thermal deviscosification, methanol may beneficially be formed. Methanol production in this fashion may increase the percentage of the original cellulosic biomass solids that are converted into useful materials. In some embodiments, methods described herein may further comprise separating the methanol from the phenolics liquid phase. Separation of the methanol may take place using any technique known in the art such as, for example, distillation, liquid-liquid extraction, or any combination thereof. In some embodiments, the methanol may be combined with the alcoholic component. In some or other embodiments, the methanol may be processed separately from the alcoholic component. After separation of the methanol and the alcoholic component, the alcoholic component and/or the methanol may be further reformed, as described hereinafter. For example, in some embodiments, the alcoholic component and/or the methanol or a product derived therefrom may undergo a condensation reaction. Moreover, the components of the light organics phase may be further reformed either together with the alcoholic component and/or methanol, or this phase can be reformed separately.

In addition to methanol, other beneficial compounds may be formed by thermal deviscosification of the phenolics liquid phase. In some embodiments, reaction products resulting from lignin depolymerization (e.g., phenolic compounds) may be separated from the phenolics liquid phase and further processed. The reaction products resulting from lignin depolymerization may be processed separately from the alcoholic component produced as described above, or they may be combined with the alcoholic component and/or the methanol and further reformed. By combining the reaction products resulting from lignin depolymerization with the alcoholic component, different fuel blends may be produced than can be obtained through further reforming of the alcoholic component alone.

In some embodiments, reducing the viscosity of the phenolics liquid phase may take place in the presence of the cellulosic biomass solids. For example, in some embodiments, the temperature within the hydrothermal digestion unit in which the cellulosic biomass solids are being digested may be sufficient to both convert the cellulosic biomass solids into soluble carbohydrates, which are subsequently reduced into an alcoholic component, and at least partially depolymerize the lignin in the phenolics liquid phase. In some or other embodiments, a temperature gradient may be maintained within the hydrothermal digestion unit such that lignin depolymerization only occurs within a portion of the hydrothermal digestion unit. For example, in some embodiments, a lower portion of the hydrothermal digestion unit, where the phenolics liquids phase settles by gravity, may be maintained at a temperature sufficient to affect lignin depolymerization, while other portions of the hydrothermal digestion unit are maintained at a lower temperature. In some embodiments, methods described herein may further comprise separating the phenolics liquid phase from the cellulosic biomass solids after reducing its viscosity. In some embodiments, the phenolics liquid phase may simply be drained from the cellulosic biomass solids after reducing its viscosity. In some or other embodiments, a mixture of the phenolics liquid phase, the aqueous phase, and/or the light organics phase may be flowed from the cellulosic biomass solids after reducing the viscosity.

In some embodiments, the phenolics liquid phase may be separated from the cellulosic biomass solids before reducing its viscosity or while reducing its viscosity. In some or other embodiments, the viscosity of the phenolics liquid phase may be reduced in stages before or while separating this phase from the cellulosic biomass solids. For example, in some embodiments, the phenolics liquid phase may be heated to a first temperature to reduce the viscosity to a first level, which allows the phenolics liquid phase to be more easily separated from the cellulosic biomass solids. After separation from the cellulosic biomass solids, the phenolics liquid phase may then be heated to a second temperature to further reduce the viscosity of the phenolics liquid phase. In some embodiments, the second temperature may be sufficient to at least partially depolymerize the lignin in the phenolics liquid phase.

When the viscosity of the phenolics liquid phase is reduced in the presence of the cellulosic biomass solids, the aqueous phase and the optional light organics phase are also generally present. After reducing the viscosity, the aqueous phase may then be separated from the phenolics liquid phase. In embodiments where the viscosity of the phenolics liquid phase is reduced after separation from the cellulosic biomass solids, the aqueous phase may or may not be present during the viscosity reduction. In some embodiments, the methods described herein may further comprise separating the phenolics liquid phase from the aqueous phase before reducing the viscosity of the phenolics liquid phase. For example, in some embodiments, a separated phenolics liquid phase may be removed from the cellulosic biomass solids and then deviscosified. However, in other embodiments, the methods described herein may further comprise separating the phenolics liquid phase from the aqueous phase after deviscosification. For example, in some embodiments, a mixture of the phenolics liquid phase and the aqueous phase may be thermally deviscosified, with phase separation taking place thereafter. In embodiments, in which a mixture of the phenolics liquid phase and the aqueous phase are thermally deviscosified, further reduction in the degree of oxygenation of the alcoholic component in the aqueous phase may occur in some cases. For example, in some embodiments, a glycol in the aqueous phase may be at least partially transformed to a monohydric alcohol when thermally deviscosifying the phenolics liquid phase in the foregoing manner.

In some embodiments, methods described herein may further comprise separating the slurry catalyst from the phenolics liquid phase after reducing its viscosity. In some embodiments, separating the slurry catalyst from the phenolics liquid phase may take place after separating the phenolics liquid phase from the cellulosic biomass solids. The technique used for separating the slurry catalyst from the phenolics liquid phase after deviscosification is not believed to be particularly limited. Illustrative techniques that may be used to separate the slurry catalyst include, for example, filtration, centrifugation, gravity-induced settling, hydroclone separation, and the like.

In some embodiments, methods described herein may further comprise returning the slurry catalyst separated from the phenolics liquid phase to the cellulosic biomass solids. Returning the slurry catalyst to the cellulosic biomass solids may allow digestion and stabilization of soluble carbohydrates by an in situ catalytic reduction reaction process to continue unabated. The technique by which the slurry catalyst is returned to the cellulosic biomass solids is not believed to be particularly limited. In some embodiments, fluid flow may be used to return the slurry catalyst to the cellulosic biomass solids. Illustrative fluid flow sources that may be used to return the slurry catalyst to the cellulosic biomass solids include, for example, a recycle flow of the aqueous phase, a return flow of the alcoholic component and/or methanol produced from the cellulosic biomass solids, or an external feed of the digestion solvent. Return of the slurry catalyst may occur continuously or non-continuously (e.g., in batch mode).

In some embodiments, methods described herein can comprise: providing cellulosic biomass solids in the presence of a digestion solvent, molecular hydrogen, and a slurry catalyst capable of activating molecular hydrogen; heating the cellulosic biomass solids to a first temperature and at least partially converting the cellulosic biomass solids into a phenolics liquid phase comprising lignin, an aqueous phase comprising an alcoholic component derived from the cellulosic biomass solids, and an optional light organics phase; wherein at least a portion of the slurry catalyst accumulates in the phenolics liquid phase as it forms; heating the phenolics liquid phase in the presence of molecular hydrogen to a second temperature that is higher than the first temperature, thereby reducing the viscosity of the phenolics liquid phase; and after reducing the viscosity of the phenolics liquid phase, separating the slurry catalyst therefrom. In some embodiments, the second temperature may be sufficient to at least partially depolymerize the lignin in the phenolics liquid phase. In some embodiments, the first temperature may be insufficient to at least partially depolymerize the lignin in the phenolics liquid phase.

In some embodiments, catalysts capable of activating molecular hydrogen and conducting a catalytic reduction reaction may comprise a metal such as, for example, Cr, Mo, W, Re, Mn, Cu, Cd, Fe, Co, Ni, Pt, Pd, Rh, Ru, Ir, Os, and alloys or any combination thereof, either alone or with promoters such as Au, Ag, Cr, Zn, Mn, Sn, Bi, B, O, and alloys or any combination thereof. In some embodiments, the catalysts and promoters may allow for hydrogenation and hydrogenolysis reactions to occur at the same time or in succession of one another. In some embodiments, such catalysts may also comprise a carbonaceous pyropolymer catalyst containing transition metals (e.g., Cr, Mo, W, Re, Mn, Cu, and Cd) or Group VIII metals (e.g., Fe, Co, Ni, Pt, Pd, Rh, Ru, Ir, and Os). In some embodiments, the foregoing catalysts may be combined with an alkaline earth metal oxide or adhered to a catalytically active support. In some or other embodiments, the catalyst capable of activating molecular hydrogen may be deposited on a catalyst support that is not itself catalytically active.

In some embodiments, the catalyst that is capable of activating molecular hydrogen may comprise a slurry catalyst. In some embodiments, the slurry catalyst may comprise a poison-tolerant catalyst. As used herein the term "poison-tolerant catalyst" refers to a catalyst that is capable of activating molecular hydrogen without needing to be regenerated or replaced due to low catalytic activity for at least about 12 hours of continuous operation. Use of a poison-tolerant catalyst may be particularly desirable when reacting soluble carbohydrates derived from cellulosic biomass solids that have not had catalyst poisons removed therefrom. Catalysts that are not poison tolerant may also be used to achieve a similar result, but they may need to be regenerated or replaced more frequently than does a poison-tolerant catalyst.

In some embodiments, suitable poison-tolerant catalysts may include, for example, sulfided catalysts. In some or other embodiments, nitrided catalysts may be used as poison-tolerant catalysts. Sulfided catalysts suitable for activating molecular hydrogen are described in commonly owned United States Patent Application Publications 2013/0109896, and 2012/0317872, each of which is incorporated herein by reference in its entirety. Sulfiding may take place by treating the catalyst with hydrogen sulfide or an alternative sulfiding agent, optionally while the catalyst is disposed on a solid support. In more particular embodiments, the poison-tolerant catalyst may comprise a sulfided cobalt-molybdate catalyst, such as a catalyst comprising about 1-10 wt. % cobalt oxide and up to about 30 wt. % molybdenum trioxide. In other embodiments, catalysts containing Pt or Pd may also be effective poison-tolerant catalysts for use in the techniques described herein. When mediating in situ catalytic reduction reaction processes, sulfided catalysts may be particularly well suited to form reaction products comprising a substantial fraction of glycols (e.g., $C_2$-$C_6$ glycols) without producing excessive amounts of the corresponding monohydric alcohols. Although poison-tolerant catalysts, particularly sulfided catalysts, may be well suited for forming glycols from soluble carbohydrates, it is to be recognized that other types of catalysts, which may not necessarily be poison-tolerant, may also be used to achieve a like result in alternative embodiments. As will be recognized by one having ordinary skill in the art, various reaction parameters (e.g., temperature, pressure, catalyst composition, introduction of other components, and the like) may be modified to favor the formation of a desired reaction product. Given the benefit of the present disclosure, one having ordinary skill in the art will be able to alter various reaction parameters to change the product distribution obtained from a particular catalyst and set of reactants.

In some embodiments, slurry catalysts suitable for use in the methods described herein may be sulfided by dispersing a slurry catalyst in a fluid phase and adding a sulfiding agent thereto. Suitable sulfiding agents may include, for example, organic sulfoxides (e.g., dimethyl sulfoxide), hydrogen sulfide, salts of hydrogen sulfide (e.g., NaSH), and the like. In some embodiments, the slurry catalyst may be concentrated in the fluid phase after sulfiding, and the concentrated slurry may then be distributed in the cellulosic biomass solids using fluid flow. Illustrative techniques for catalyst sulfiding that may be used in conjunction with the methods described herein are described in United States Patent Patent Application Publication No. 20100236988, filed on Mar. 19, 2009 and incorporated herein by reference in its entirety.

In various embodiments, slurry catalysts used in conjunction with the methods described herein may have a particulate size of about 250 microns or less. In some embodiments, the slurry catalyst may have a particulate size of about 100 microns or less, or about 10 microns or less. In some embodiments, the minimum particulate size of the slurry catalyst may be about 1 micron. In some embodiments, the slurry catalyst may comprise catalyst fines in the processes described herein. As used herein, the term "catalyst fines" refers to solid catalysts having a nominal particulate size of about 100 microns or less. Catalyst fines may be generated from catalyst production processes, for example, during extrusion of solid catalysts. Catalyst fines may also be produced by grinding larger catalyst solids or during regeneration of catalyst solids. Suitable methods for producing catalyst fines are described in U.S. Pat. Nos. 6,030,915 and 6,127,229, each of which is incorporated herein by reference in its entirety. In some instances, catalyst fines may be intentionally removed from a solid catalyst production run, since they may be difficult to sequester in some catalytic processes. Techniques for removing catalyst fines from larger catalyst solids may include, for example, sieving or like size separation processes. When conducting in situ catalytic reduction reaction processes, such as those described herein, catalyst fines may be particularly well suited, since they can be easily fluidized and distributed in the interstitial pore space of the digesting cellulosic biomass solids.

Catalysts that are not particularly poison-tolerant may also be used in conjunction with the techniques described herein. Such catalysts may include, for example, Ru, Pt, Pd, or compounds thereof disposed on a solid support such as, for example, Ru on titanium dioxide or Ru on carbon. Although such catalysts may not have particular poison tolerance, they may be regenerable, such as through exposure of the catalyst to water at elevated temperatures, which may be in either a subcritical state or a supercritical state.

In some embodiments, the catalysts used in conjunction with the processes described herein may be operable to generate molecular hydrogen. For example, in some embodiments, catalysts suitable for aqueous phase reforming (i.e., APR catalysts) may be used. Suitable APR catalysts may include, for example, catalysts comprising Pt, Pd, Ru, Ni, Co, or other Group VIII metals alloyed or modified with Re, Mo, Sn, or other metals. Thus, in some embodiments described herein, an external hydrogen feed may not be needed in order to effectively carry out the stabilization of soluble carbohydrates by a catalytic reduction reaction.

However, in other embodiments, an external hydrogen feed may be used, optionally in combination with internally generated hydrogen.

In some embodiments, the molecular hydrogen may be externally supplied to the cellulosic biomass solids. For example, in some embodiments, the molecular hydrogen may be supplied as an upwardly directed fluid stream. Benefits of supplying an upwardly directed fluid stream have been described herein. In some or other embodiments, the molecular hydrogen may be generated internally through use of an APR catalyst.

In various embodiments described herein, a slurry catalyst may be at least partially distributed within a charge of cellulosic biomass solids during hydrothermal digestion, particularly using upwardly directed fluid flow. As used herein, the terms "distribute," "distribution," and variants thereof refer to a condition in which a slurry catalyst is present at all heights of a charge of cellulosic biomass. No particular degree of distribution is implied by use of the term "distribute" or its variants. In some embodiments, the distribution may comprise a substantially homogeneous distribution, such that a concentration of the slurry catalyst is substantially the same at all heights of a cellulosic biomass charge. In other embodiments, the distribution may comprise a heterogeneous distribution, such that different concentrations of the slurry catalyst are present at various heights of the cellulosic biomass charge. When a heterogeneous distribution of the slurry catalyst is present, a concentration of the slurry catalyst within the cellulosic biomass solids may increase from top to bottom in some embodiments or decrease from top to bottom in other embodiments. In some embodiments, a heterogeneous distribution may comprise an irregular concentration gradient.

In some embodiments, the methods described herein may further comprise supplying upwardly directed fluid flow through the cellulosic biomass solids. In various embodiments, the upwardly directed fluid flow may comprise a gas stream, a liquid stream, or any combination thereof. In some embodiments, the upwardly directed fluid flow may comprise one upwardly directed fluid stream, or two upwardly directed fluid streams, or three upwardly directed fluid streams, or four upwardly directed fluid streams, or five upwardly directed fluid streams.

In some embodiments, at least some of the one or more upwardly directed fluid streams may contain the slurry catalyst at its source. That is, the fluid stream(s) may comprise a stream of the slurry catalyst. The one or more upwardly directed fluid streams may convey the slurry catalyst therein, thereby at least partially distributing the slurry catalyst in the cellulosic biomass solids. For example, in some embodiments, the upwardly directed fluid stream may comprise a circulating fluid containing the slurry catalyst therein. In other embodiments, the one or more upwardly directed fluid streams may not contain the slurry catalyst at its source, but they may still fluidize slurry catalyst located in or near the cellulosic biomass solids. For example, a gas stream may not contain the slurry catalyst at its source, but it may still promote fluidization of slurry catalyst in or near the cellulosic biomass solids. A liquid stream lacking the slurry catalyst may promote fluidization of slurry catalyst in or near the cellulosic biomass solids in a manner like that described for a gas stream.

In some embodiments, the one or more upwardly directed fluid streams may comprise a gas stream. For example, in some embodiments, a gas stream being used for upwardly directed fluid flow may comprise a stream of molecular hydrogen. In some or other embodiments, steam, compressed air, or an inert gas such as nitrogen, for example, may be used in place of or in addition to a stream of molecular hydrogen. Up to about 40% steam may be present in the fluid stream in various embodiments. An upwardly directed gas stream may be used to distribute the slurry catalyst within the cellulosic biomass solids when a liquid stream alone is insufficient to distribute the slurry catalyst, for example. When used alone, a gas stream generally does not convey the slurry catalyst beyond the aqueous phase and/or optional light organics phase disposed about the cellulosic biomass solids.

In some embodiments, the one or more upwardly directed fluid streams may comprise a liquid stream. An upwardly directed liquid stream may be used to distribute the slurry catalyst within the cellulosic biomass solids when it is not necessarily desired to maintain the slurry catalyst within the cellulosic biomass solids and/or a gas stream alone is insufficient to distribute the slurry catalyst, for example. Unlike a gas stream, described above, a liquid stream may, in some embodiments, convey the slurry catalyst beyond the cellulosic biomass solids, add to a liquid head surrounding the cellulosic biomass solids, and eventually spill over. In other embodiments, slurry catalyst fluidization may be incomplete, and a liquid stream may still not convey the slurry catalyst completely through the cellulosic biomass solids before spilling over.

In some embodiments, at least a portion of the liquid head disposed about the cellulosic biomass solids may be circulated through the cellulosic biomass solids. The liquid head may comprise the digestion solvent, any liquid phase being added by a liquid stream, and any liquid component being formed from the cellulosic biomass solids. More specifically, the liquid head may comprise the phenolics liquid phase, the aqueous phase, the optional light organics phase, any liquid phase being added by a liquid stream, and any liquid component being formed from the cellulosic biomass solids.

In some embodiments, the phenolics liquid phase, the aqueous phase, and/or the light organics phase may be combined with one another and circulated through the cellulosic biomass solids. In some or other embodiments, at least a portion of the aqueous phase may be circulated through the cellulosic biomass solids. As used herein, the term "circulate" and variants thereof will be used to refer to the condition that exists when at least a portion of the aqueous phase or another liquid phase is removed from the cellulosic biomass solids and is subsequently reintroduced one or more times thereto. By maintaining the aqueous phase with the cellulosic biomass solids through circulation, it may continue to serve as a digestion solvent for promoting the production of soluble carbohydrates, which are subsequently reduced to the alcoholic component. Moreover, circulation of the aqueous phase may promote distribution of the slurry catalyst in the cellulosic biomass solids. In some embodiments, at least a portion of the slurry catalyst may circulate with the aqueous phase through the cellulosic biomass solids. In some or other embodiments, upwardly directed fluid flow of the aqueous phase may promote fluidization of the slurry catalyst in the cellulosic biomass solids such that the slurry catalyst accumulates in the phenolics liquid phase less rapidly. In still other embodiments, upwardly directed fluid flow of the aqueous phase may pass through the phenolics liquid phase such that slurry catalyst accumulated therein is at least partially fluidized for distribution in the cellulosic biomass solids.

In some embodiments, at least partially converting the cellulosic biomass solids into a phenolics liquid phase comprising lignin, an aqueous phase comprising an alcoholic component derived from the cellulosic biomass solids, and an optional light organics phase may take place in a hydrothermal digestion unit. Suitable hydrothermal digestion units configured for circulating a liquid phase therethrough are described in commonly owned U.S. Patent Application 61/665,717, filed on Jun. 28, 2012 (PCT/US2013/048212) and incorporated herein by reference in its entirety. Specifically, the hydrothermal digestion units may comprise a fluid circulation loop through which the fluid phase and optionally a slurry catalyst are circulated for distribution in the cellulosic biomass solids. Further discussion of hydrothermal digestion units and systems suitable for processing cellulosic biomass solids in the presence of a phenolics liquid phase are described in additional detail hereinafter.

In some embodiments, the hydrothermal digestion unit may be charged with a fixed amount of slurry catalyst, while cellulosic biomass solids are continuously or semi-continuously fed thereto, thereby allowing hydrothermal digestion to take place in a continual manner. That is, fresh cellulosic biomass solids may be added to the hydrothermal digestion unit on a continual or an as-needed basis in order to replenish cellulosic biomass solids that have been digested to form soluble carbohydrates. As noted above, ongoing addition of cellulosic biomass solids to the hydrothermal digestion unit may result in formation of the phenolics liquid phase. In some embodiments, the cellulosic biomass solids may be continuously or semi-continuously added to the hydrothermal digestion unit while the hydrothermal digestion unit is in a pressurized state. In some embodiments, the pressurized state may comprise a pressure of at least about 30 bar. Without the ability to introduce fresh cellulosic biomass to a pressurized hydrothermal digestion unit, depressurization and cooling of the hydrothermal digestion unit may take place during biomass addition, significantly reducing the energy- and cost-efficiency of the biomass conversion process. As used herein, the term "continuous addition" and grammatical equivalents thereof will refer to a process in which cellulosic biomass solids are added to a hydrothermal digestion unit in an uninterrupted manner without fully depressurizing the hydrothermal digestion unit. As used herein, the term "semi-continuous addition" and grammatical equivalents thereof will refer to a discontinuous, but as-needed, addition of cellulosic biomass solids to a hydrothermal digestion unit without fully depressurizing the hydrothermal digestion unit. Techniques through which cellulosic biomass solids may be added continuously or semi-continuously to a pressurized hydrothermal digestion unit are discussed in more detail hereinbelow.

In some embodiments, cellulosic biomass solids being continuously or semi-continuously added to the hydrothermal digestion unit may be pressurized before being added to the hydrothermal digestion unit, particularly when the hydrothermal digestion unit is in a pressurized state. Pressurization of the cellulosic biomass solids from atmospheric pressure to a pressurized state may take place in one or more pressurization zones before addition of the cellulosic biomass solids to the hydrothermal digestion unit. Suitable pressurization zones that may be used for pressurizing and introducing cellulosic biomass solids to a pressurized hydrothermal digestion unit are described in more detail in commonly owned United States Patent Application Publications 2013/0152457 and 2013/0152458, and incorporated herein by reference in its entirety. Suitable pressurization zones described therein may include, for example, pressure vessels, pressurized screw feeders, and the like. In some embodiments, multiple pressurization zones may be connected in series to increase the pressure of the cellulosic biomass solids in a stepwise manner.

In some embodiments, at least a portion of the aqueous phase may be circulated through the cellulosic biomass solids. For example, the aqueous phase may be circulated through a fluid conduit configured as a fluid circulation loop external to the hydrothermal digestion unit. In circulating the aqueous phase through the cellulosic biomass solids, at least a portion of the slurry catalyst may also be circulated and become distributed in the cellulosic biomass solids as well.

In some embodiments, at least a portion of the aqueous phase containing the alcoholic component may be withdrawn from the cellulosic biomass solids for subsequent processing. In some embodiments, the aqueous phase may be combined with the phenolics liquid phase and/or the light organics phase during at least a portion of the subsequent processing, and in other embodiments, the aqueous phase may be subsequently processed separately from these phases. In some embodiments, subsequent processing of the aqueous phase may comprise conducting a second catalytic reduction reaction, if needed, for example, to increase the amount of soluble carbohydrates that are converted into the alcoholic component or to further reduce the degree of oxygenation of the alcoholic components that are formed. In some or other embodiments, the alcoholic component may be further reformed without further transforming the alcoholic component through an intervening second catalytic reduction reaction. In some embodiments, the alcoholic component may be further reformed through any combination and sequence of further hydrogenolysis reactions and/or hydrogenation reactions, condensation reactions, isomerization reactions, oligomerization reactions, hydrotreating reactions, alkylation reactions, and the like. In some embodiments, an initial operation of downstream reforming may comprise a condensation reaction, often conducted in the presence of a condensation catalyst, in which the alcoholic component or a product formed therefrom is condensed with another molecule to form a higher molecular weight compound. As used herein, the term "condensation reaction" will refer to a chemical transformation in which two or more molecules are coupled with one another to form a carbon-carbon bond in a higher molecular weight compound, usually accompanied by the loss of a small molecule such as water or an alcohol. An illustrative condensation reaction is the Aldol condensation reaction, which will be familiar to one having ordinary skill in the art. Additional disclosure regarding condensation reactions and catalysts suitable for promoting condensation reactions is provided hereinbelow.

In some embodiments, the methods described herein may further comprise at least partially separating the alcoholic component from at least a portion of the aqueous phase, thereby producing a dried alcoholic component. In some embodiments, the alcoholic component separated from the aqueous phase may be subjected to the downstream reforming reactions noted above, particularly a condensation reaction. Separation of the alcoholic component from the aqueous phase may be particularly beneficial to prolong the condensation catalyst's life. However, it is to be recognized that in alternative embodiments, the alcoholic component of the aqueous phase may be further reformed while "wet," if desired, by subjecting the aqueous phase to a condensation catalyst directly or by only removing a portion of the water therefrom.

In some or other embodiments, at least a portion of the alcoholic component may be separated from the aqueous phase, and the separated alcoholic component may be returned to the cellulosic biomass solids. Return of a separated alcoholic component to the cellulosic biomass solids may be used to reduce the water content of the digestion solvent, if desired. When a separated alcoholic component is returned to the cellulosic biomass solids, a stream of the alcoholic component may promote distribution of the cellulosic biomass solids in a like manner to that described above. Additional advantages of returning a portion of the alcoholic component to the cellulosic biomass solids may include promoting solubility of soluble carbohydrates and alcoholic components produced therefrom and for removing deposits from the slurry catalyst mediating the stabilization of soluble carbohydrates.

In general, any suitable technique may be used to separate the alcoholic component from the aqueous phase. In some embodiments, the alcoholic component and the aqueous phase may be separated from one another by distillation. In some or other embodiments, the alcoholic component and the aqueous phase may be separated from one another by liquid-liquid extraction, gravity-induced settling, or any combination thereof. In some embodiments, separation of the alcoholic component from the aqueous phase may produce a dried alcoholic component. As described above, production of a dried alcoholic component may present particular advantages for downstream reforming.

As used herein, the term "dried alcoholic component" refers to a liquid phase that has had a least a portion of the water removed therefrom. It is to be recognized that a dried alcoholic component need not necessarily be completely anhydrous when dried, simply that its water content be reduced (e.g., less than 50 wt. % water). In some embodiments, the dried alcoholic component may comprise about 40 wt. % or less water. In some or other embodiments, the dried alcoholic component may comprise about 35 wt. % or less water, or about 30 wt. % or less water, or about 25 wt. % or less water, or about 20 wt. % or less water, or about 15 wt. % or less water, or about 10 wt. % or less water, or about 5 wt. % or less water. In some embodiments of the methods described herein, a substantially anhydrous alcoholic component may be produced upon drying the reaction product. As used herein, a substance will be considered to be substantially anhydrous if it contains about 5 wt. % water or less.

In some embodiments, the alcoholic component being separated from the aqueous phase may be re-combined with the phenolics liquid phase before deviscosification takes place. This approach may present particular advantages when the alcoholic component comprises a glycol. Specifically, monohydric alcohols may be difficult to prepare in dried form due to azeotrope formation with water. Glycols, in contrast, are not believed to readily form binary azeotropes with water. Accordingly, glycols may be produced in dried form by distillation. However, monohydric alcohols may be more desired than are glycols for downstream reforming reactions, particularly downstream condensation reactions, due to a reduced incidence of coking. Thermal deviscosification conditions are similar to those used to convert glycols into monohydric alcohols. Thus, by combining dried glycols with the phenolics liquid phase prior to reducing its viscosity, dried monohydric alcohols may be concurrently produced for downstream reforming reactions. Such approaches are described in commonly owned U.S. Patent Application 61/720,774, filed on Oct. 31, 2012 entitled "Methods and Systems for Processing Lignin During Hydrothermal Digestion of Cellulosic Biomass Solids While Producing a Monohydric Alcohol Feed," filed concurrently herewith and incorporated herein by reference in its entirety. In some embodiments, the methods described herein may further comprise separating the monohydric alcohols from the phenolics liquid phase after reducing the viscosity.

In some embodiments, reducing the viscosity of the phenolics liquid phase may take place after separating the phenolics liquid phase from the aqueous phase. In other embodiments, reducing the viscosity of the phenolics liquid phase may take place prior to separating the phenolics liquid phase from the aqueous phase or while separating the phenolics liquid phase and the aqueous phase. For example, in some embodiments, hydrothermal digestion of the cellulosic biomass solids may take place at a temperature such that the viscosity of the phenolics liquid phase is reduced. In some or other embodiments, the phenolics liquid phase may be separated from the aqueous phase and removed from the hydrothermal digestion before reducing the viscosity, although not necessarily in that order. For example, in some embodiments, the aqueous phase and the phenolics liquid phase may be removed from the hydrothermal digestion unit together, and separation of the phenolics liquid phase may then take place external to the hydrothermal digestion unit. In such embodiments, viscosity reduction may take place before or after separation from the aqueous phase has occurred. Further, in some embodiments, removing the slurry catalyst from the phenolics liquid phase may take place external to the hydrothermal digestion unit once viscosity reduction has taken place.

In some embodiments, a portion of the phenolics liquid phase may be removed from the cellulosic biomass solids. In some embodiments, at least a portion of the phenolics liquid phase removed from the cellulosic biomass solids may be returned thereto. For example, in some embodiments, at least a portion of the phenolics liquid phase may be circulated external to the cellulosic biomass solids and thereafter returned thereto. Viscosity reduction of the phenolics liquid phase may take place while it is being circulated external to the cellulosic biomass solids. In some or other embodiments, at least a portion of the phenolics liquid phase may be conveyed to a point above at least a portion of the cellulosic biomass solids and released, thereby releasing the slurry catalyst for downward percolation through the cellulosic biomass solids. Techniques for downward percolation of a slurry catalyst in a phenolics liquid phase are described in commonly owned U.S. Patent Application 61/720,757, filed on Oct. 31, 2012, entitled "Methods and Systems for Distributing a Slurry Catalyst in Cellulosic Biomass Solids," filed concurrently herewith and incorporated herein by reference in its entirety. In other embodiments described herein, the phenolics liquid phase, once removed from the cellulosic biomass solids, is not returned thereto.

In some embodiments, after at least partially depolymerizing the lignin and separating the slurry catalyst therefrom, the phenolics liquid phase may be still further processed. In some embodiments, reaction products resulting from lignin depolymerization (e.g., phenolic compounds and/or methanol) may be separated from the phenolics liquid phase and further processed. The reaction products resulting from lignin depolymerization may be processed separately from the alcoholic component derived from the cellulosic biomass solids, or the reaction products resulting from lignin depolymerization may be combined with the alcoholic component and further reformed. By combining the reaction products resulting from lignin depolymerization with the alcoholic component, different fuel blends may be produced than can be obtained through further reforming of the alcoholic component alone. Methanol, in particular, may be a particularly desirable reaction product to combine with the alcoholic component, since it may be processed in a similar manner to the alcoholic component produced from the cellulosic biomass solids. Incorporating methanol produced from lignin depolymerization may desirably increase the amount of the raw cellulosic biomass solids that can be reformed into valuable products downstream. In some embodiments, methods described herein may further comprise forming methanol in the phenolics liquid phase while at least partially depolymerizing the lignin. In some embodiments, the methods may further comprise combining the methanol with the alcoholic component.

In some instances it may be desirable to conduct one or more further catalytic reduction reactions on the alcoholic component in the aqueous phase and/or the methanol produced from the phenolics liquid phase or a reaction product formed therefrom. For example, in some embodiments, it may be desirable to perform a second catalytic reduction reaction on the aqueous phase external to the hydrothermal digestion unit in which it was formed. In various embodiments, performing a second catalytic reduction reaction on the aqueous phase may comprise increasing a quantity of the alcoholic component, increasing the amount of soluble carbohydrates that are transformed, and/or further decreasing the degree of oxygenation of the alcoholic component. Choice of whether to perform a second catalytic reduction reaction may be made, for example, based upon whether sufficient quantities of the alcoholic component have been formed and/or if further stabilization of soluble carbohydrates is desired. In some embodiments, glycols formed by an in situ catalytic reduction reaction process may be transformed into monohydric alcohols by performing a second catalytic reduction reaction. In some embodiments, the monohydric alcohols formed in the second catalytic reduction reaction may comprise a feed for further reforming reactions.

In some embodiments, the catalyst used for mediating a second catalytic reduction reaction may be the same catalyst used for mediating the first catalytic reduction reaction. In other embodiments, the catalyst used for mediating the second catalytic reduction reaction may be different than that used for mediating the first catalytic reduction reaction. For example, in some embodiments, a slurry catalyst may be used to mediate the first catalytic reduction reaction, and a fixed bed catalyst may be used to mediate the second catalytic reduction reaction. In other embodiments, a poison-tolerant catalyst may be used to mediate the first catalytic reduction reaction, and a non-poison-tolerant catalyst may be used to mediate the second catalytic reduction reaction, particularly if catalyst poisons can be removed from the aqueous phase before performing the second catalytic reduction reaction. In still other embodiments, a first poison-tolerant catalyst may be used to mediate the first catalytic reduction reaction, and a second poison-tolerant catalyst may be used to mediate the second catalytic reduction reaction. For example, in some embodiments, a poison-tolerant slurry catalyst may be used to mediate the first catalytic reduction reaction, and a fixed bed poison-tolerant catalyst may be used to mediate the second catalytic reduction reaction.

In some embodiments, the alcoholic component produced by the methods described hereinabove may be subjected to additional reforming reactions. In addition, the light organics phase may also be subjected to the additional reforming reactions, either separately or combined with the alcoholic component. The reforming reactions may be catalytic or non-catalytic. Such additional reforming reactions may comprise any combination of further catalytic reduction reactions (e.g., hydrogenation reactions, hydrogenolysis reactions, hydrotreating reactions, and the like), condensation reactions, isomerization reactions, desulfurization reactions, dehydration reactions, oligomerization reactions, alkylation reactions, and the like.

In some embodiments, the first operation of further reforming the alcoholic component may comprise a condensation reaction. Ordinarily, alcohols do not directly undergo condensation reactions, although they are not expressly precluded from doing so. Instead, in order to undergo a condensation reaction, an alcohol is usually converted into a carbonyl compound or a compound that may subsequently react to form a carbonyl compound. The transformation to form the carbonyl compound may take place in concert with the condensation reaction or occur in a discrete conversion prior to the condensation reaction. Suitable transformations for converting alcohols into carbonyl compounds or compounds that may be transformed into carbonyl compounds include, for example, dehydrogenation reactions, dehydration reactions, oxidation reactions, or any combination thereof. When the carbonyl compound is formed catalytically, the same catalyst or a different catalyst than that used to carry out the condensation reaction may be used.

Although a number of different types of catalysts may be used for mediating condensation reactions, zeolite catalysts may be particularly advantageous in this regard. One zeolite catalyst that may be particularly well suited for mediating condensation reactions of alcohols is ZSM-5 (Zeolite Socony Mobil 5), a pentasil aluminosilicate zeolite having a composition of $Na_nAl_nSi_{96-n}O_{192} \cdot 16H_2O$ (0<n<27), which may transform an alcohol feed into a condensation product. Without being bound by any theory or mechanism, it is believed that this catalyst may promote condensation of alcohols in a concerted manner by mediating a dehydrogenation reaction to produce a carbonyl compound which subsequently undergoes the desired condensation reaction. Other suitable zeolite catalysts may include, for example, ZSM-12, ZSM-22, ZSM-23, SAPO-11, and SAPO-41. Additional types of suitable condensation catalysts are also discussed in more detail herein.

In some embodiments, prior to performing a condensation reaction, a slurry catalyst used in conjunction with mediating a first and/or second catalytic reduction reaction may be removed from the alcoholic component. Suitable techniques for removing a slurry catalyst from the alcoholic component may include, for example, filtration, membrane separation, separation by centrifugal or centripetal force (e.g., hydroclones and centrifuges), gravity-induced settling, and the like. In some embodiments, slurry catalyst may remain as a bottoms residue when distillation is used to separate the alcoholic component from the aqueous phase. Sulfided catalysts may be particularly advantageous in this regard, since they may experience minimal loss in their catalytic activity when present in an aqueous phase that is being distilled. Regardless of how separation takes place, the slurry catalyst may subsequently be returned to the cellulosic biomass solids, if desired. If needed, the slurry catalyst may be regenerated before or while being returned to the cellulosic biomass solids.

In various embodiments, the condensation reaction may take place at a temperature ranging between about 5° C. and about 500° C. The condensation reaction may take place in a condensed phase (e.g., a liquor phase) or in a vapor phase. For condensation reactions taking place in a vapor phase, the temperature may range between about 75° C. and about 500° C., or between about 125° C. and about 450° C. For condensation reactions taking place in a condensed phase, the temperature may range between about 5° C. and about 475° C., or between about 15° C. and about 300° C., or between about 20° C. and about 250° C.

In various embodiments, the higher molecular weight compound produced by the condensation reaction may comprise $\geq C_4$ hydrocarbons. In some or other embodiments, the higher molecular weight compound produced by the condensation reaction may comprise $\geq C_6$ hydrocarbons. In some embodiments, the higher molecular weight compound produced by the condensation reaction may comprise $C_4$-$C_{30}$ hydrocarbons. In some embodiments, the higher molecular weight compound produced by the condensation reaction may comprise $C_6$-$C_{30}$ hydrocarbons. In still other embodiments, the higher molecular weight compound produced by the condensation reaction may comprise $C_4$-$C_{24}$ hydrocarbons, or $C_6$-$C_{24}$ hydrocarbons, or $C_4$-$C_{18}$ hydrocarbons, or $C_6$-$C_{18}$ hydrocarbons, or $C_4$-$C_{12}$ hydrocarbons, or $C_6$-$C_{12}$ hydrocarbons. As used herein, the term "hydrocarbons" refers to compounds containing both carbon and hydrogen without reference to other elements that may be present. Thus, heteroatom-substituted compounds are also described herein by the term "hydrocarbons."

The particular composition of the higher molecular weight compound produced by the condensation reaction may vary depending on the catalyst(s) and temperatures used for both the catalytic reduction reaction and the condensation reaction, as well as other parameters such as pressure. For example, in some embodiments, the product of the condensation reaction may comprise $\geq C_4$ alcohols and/or ketones that are produced concurrently with or in lieu of $\geq C_4$ hydrocarbons. In some embodiments, the $\geq C_4$ hydrocarbons produced by the condensation reaction may contain various olefins in addition to alkanes of various sizes, typically branched alkanes. In still other embodiments, the $\geq C_4$ hydrocarbons produced by the condensation reaction may also comprise cyclic hydrocarbons and/or aromatic compounds. In some embodiments, the higher molecular weight compound produced by the condensation reaction may be further subjected to a catalytic reduction reaction to transform a carbonyl functionality therein to an alcohol and/or a hydrocarbon and to convert olefins into alkanes.

Exemplary compounds that may be produced by a condensation reaction include, for example, $\geq C_4$ alkanes, $\geq C_4$ alkenes, $\geq C_5$ cycloalkanes, $\geq C_5$ cycloalkenes, aryls, fused aryls, $\geq C_4$ alcohols, $\geq C_4$ ketones, and mixtures thereof. The $\geq C_4$ alkanes and $\geq C_4$ alkenes may range from 4 to about 30 carbon atoms (i.e. $C_4$-$C_{30}$ alkanes and $C_4$-$C_{30}$ alkenes) and may be branched or straight chain alkanes or alkenes. The $\geq C_4$ alkanes and $\geq C_4$ alkenes may also include fractions of $C_7$-$C_{14}$, $C_{12}$-$C_{24}$ alkanes and alkenes, respectively, with the $C_7$-$C_{14}$ fraction directed to jet fuel blends, and the $C_{12}$-$C_{24}$ fraction directed to diesel fuel blends and other industrial applications. Examples of various $\geq C_4$ alkanes and $\geq C_4$ alkenes that may be produced by the condensation reaction include, without limitation, butane, butene, pentane, pentene, 2-methylbutane, hexane, hexene, 2-methylpentane, 3-methylpentane, 2,2-dimethylbutane, 2,3-dimethylbutane, heptane, heptene, octane, octene, 2,2,4,-trimethylpentane, 2,3-dimethylhexane, 2,3,4-trimethylpentane, 2,3-dimethylpentane, nonane, nonene, decane, decene, undecane, undecene, dodecane, dodecene, tridecane, tridecene, tetradecane, tetradecene, pentadecane, pentadecene, hexadecane, hexadecene, heptyldecane, heptyldecene, octyldecane, octyldecene, nonyldecane, nonyldecene, eicosane, eicosene, uneicosane, uneicosene, doeicosane, doeicosene, trieicosane, trieicosene, tetraeicosane, tetraeicosene, and isomers thereof.

The $\geq C_5$ cycloalkanes and $\geq C_5$ cycloalkenes may have from 5 to about 30 carbon atoms and may be unsubstituted, mono-substituted or multi-substituted. In the case of mono-substituted and multi-substituted compounds, the substituted group may include a branched $\geq C_3$ alkyl, a straight chain $\geq C_1$ alkyl, a branched $\geq C_3$ alkylene, a straight chain $\geq C_1$ alkylene, a straight chain $\geq C_2$ alkylene, an aryl group, or a combination thereof. In some embodiments, at least one of the substituted groups may include a branched $C_3$-$C_{12}$ alkyl, a straight chain $C_1$-$C_{12}$ alkyl, a branched $C_3$-$C_{12}$ alkylene, a straight chain $C_1$-$C_{12}$ alkylene, a straight chain $C_2$-$C_{12}$ alkylene, an aryl group, or a combination thereof. In yet other embodiments, at least one of the substituted groups may include a branched $C_3$-$C_4$ alkyl, a straight chain $C_1$-$C_4$ alkyl, a branched $C_3$-$C_4$ alkylene, a straight chain $C_1$-$C_4$ alkylene, a straight chain $C_2$-$C_4$ alkylene, an aryl group, or any combination thereof. Examples of $\geq C_5$ cycloalkanes and $\geq C_5$ cycloalkenes that may be produced by the condensation reaction include, without limitation, cyclopentane, cyclopentene, cyclohexane, cyclohexene, methylcyclopentane, methylcyclopentene, ethylcyclopentane, ethylcyclopentene, ethylcyclohexane, ethylcyclohexene, and isomers thereof.

The moderate fractions of the condensation reaction, such as $C_7$-$C_{14}$, may be separated for jet fuel, while heavier fractions, such as $C_{12}$-$C_{24}$, may be separated for diesel use. The heaviest fractions may be used as lubricants or cracked to produce additional gasoline and/or diesel fractions. The $\geq C_4$ compounds may also find use as industrial chemicals, whether as an intermediate or an end product. For example, the aryl compounds toluene, xylene, ethylbenzene, para-xylene, meta-xylene, and ortho-xylene may find use as chemical intermediates for the production of plastics and other products. Meanwhile, $C_9$ aromatic compounds and fused aryl compounds, such as naphthalene, anthracene, tetrahydronaphthalene, and decahydronaphthalene, may find use as solvents or additives in industrial processes.

In some embodiments, a single catalyst may mediate the transformation of the alcoholic component into a form suitable for undergoing a condensation reaction as well as mediating the condensation reaction itself. In other embodiments, a first catalyst may be used to mediate the transformation of the alcoholic component into a form suitable for undergoing a condensation reaction, and a second catalyst may be used to mediate the condensation reaction. Unless otherwise specified, it is to be understood that reference herein to a condensation reaction and condensation catalyst refers to either type of condensation process. Further disclosure of suitable condensation catalysts now follows.

In some embodiments, a single catalyst may be used to form a higher molecular weight compound via a condensation reaction. Without being bound by any theory or mechanism, it is believed that such catalysts may mediate an initial dehydrogenation of the alcoholic component, followed by a condensation reaction of the dehydrogenated alcoholic component. Zeolite catalysts are one type of catalyst suitable for directly converting alcohols to condensation products in such a manner. A particularly suitable zeolite catalyst in this regard may be ZSM-5, although other zeolite catalysts may also be suitable.

In some embodiments, two catalysts may be used to form a higher molecular weight compound via a condensation reaction. Without being bound by any theory or mechanism, it is believed that the first catalyst may mediate an initial dehydrogenation of the alcoholic component, and the second catalyst may mediate a condensation reaction of the dehydrogenated alcoholic component. Like the single-catalyst embodiments discussed previously above, in some embodiments, zeolite catalysts may be used as either the first catalyst or the second catalyst. Again, a particularly suitable zeolite catalyst in this regard may be ZSM-5, although other zeolite catalysts may also be suitable.

Various catalytic processes may be used to form higher molecular weight compounds by a condensation reaction. In some embodiments, the catalyst used for mediating a condensation reaction may comprise a basic site, or both an acidic site and a basic site. Catalysts comprising both an acidic site and a basic site will be referred to herein as multi-functional catalysts. In some or other embodiments, a catalyst used for mediating a condensation reaction may comprise one or more metal atoms. Any of the condensation catalysts may also optionally be disposed on a solid support, if desired.

In some embodiments, the condensation catalyst may comprise a basic catalyst comprising Li, Na, K, Cs, B, Rb, Mg, Ca, Sr, Si, Ba, Al, Zn, Ce, La, Y, Sc, Y, Zr, Ti, hydrotalcite, zinc-aluminate, phosphate, base-treated aluminosilicate zeolite, a basic resin, basic nitride, alloys or any combination thereof. In some embodiments, the basic catalyst may also comprise an oxide of Ti, Zr, V, Nb, Ta, Mo, Cr, W, Mn, Re, Al, Ga, In, Co, Ni, Si, Cu, Zn, Sn, Cd, Mg, P, Fe, or any combination thereof. In some embodiments, the basic catalyst may comprise a mixed-oxide basic catalyst. Suitable mixed-oxide basic catalysts may comprise, for example, Si—Mg—O, Mg—Ti—O, Y—Mg—O, Y—Zr—O, Ti—Zr—O, Ce—Zr—O, Ce—Mg—O, Ca—Zr—O, La—Zr—O, B—Zr—O, La—Ti—O, B—Ti—O, and any combination thereof. In some embodiments, the condensation catalyst may further include a metal or alloys comprising metals such as, for example, Cu, Ag, Au, Pt, Ni, Fe, Co, Ru, Zn, Cd, Ga, In, Rh, Pd, Ir, Re, Mn, Cr, Mo, W, Sn, Bi, Pb, Os, alloys and combinations thereof. Use of metals in the condensation catalyst may be desirable when a dehydrogenation reaction is to be carried out in concert with the condensation reaction. Basic resins may include resins that exhibit basic functionality. The basic catalyst may be self-supporting or adhered to a support containing a material such as, for example, carbon, silica, alumina, zirconia, titania, vanadia, ceria, nitride, boron nitride, a heteropolyacid, alloys and mixtures thereof.

In some embodiments, the condensation catalyst may comprise a hydrotalcite material derived from a combination of MgO and $Al_2O_3$. In some embodiments, the condensation catalyst may comprise a zinc aluminate spinel formed from a combination of ZnO and $Al_2O_3$. In still other embodiments, the condensation catalyst may comprise a combination of ZnO, $Al_2O_3$, and CuO. Each of these materials may also contain an additional metal or alloy, including those more generally referenced above for basic condensation catalysts. In more particular embodiments, the additional metal or alloy may comprise a Group 10 metal such Pd, Pt, or any combination thereof.

In some embodiments, the condensation catalyst may comprise a basic catalyst comprising a metal oxide containing, for example, Cu, Ni, Zn, V, Zr, or any mixture thereof. In some or other embodiments, the condensation catalyst may comprise a zinc aluminate containing, for example, Pt, Pd, Cu, Ni, or any mixture thereof.

In some embodiments, the condensation catalyst may comprise a multi-functional catalyst having both an acidic functionality and a basic functionality. Such condensation catalysts may comprise a hydrotalcite, a zinc-aluminate, a phosphate, Li, Na, K, Cs, B, Rb, Mg, Si, Ca, Sr, Ba, Al, Ce, La, Sc, Y, Zr, Ti, Zn, Cr, or any combination thereof. In further embodiments, the multi-functional catalyst may also include one or more oxides from the group of Ti, Zr, V, Nb, Ta, Mo, Cr, W, Mn, Re, Al, Ga, In, Fe, Co, Ir, Ni, Si, Cu, Zn, Sn, Cd, P, and any combination thereof. In some embodiments, the multi-functional catalyst may include a metal such as, for example, Cu, Ag, Au, Pt, Ni, Fe, Co, Ru, Zn, Cd, Ga, In, Rh, Pd, Ir, Re, Mn, Cr, Mo, W, Sn, Os, alloys or combinations thereof. The basic catalyst may be self-supporting or adhered to a support containing a material such as, for example, carbon, silica, alumina, zirconia, titania, vanadia, ceria, nitride, boron nitride, a heteropolyacid, alloys and mixtures thereof.

In some embodiments, the condensation catalyst may comprise a metal oxide containing Pd, Pt, Cu or Ni. In still other embodiments, the condensation catalyst may comprise an aluminate or a zirconium metal oxide containing Mg and Cu, Pt, Pd or Ni. In still other embodiments, a multi-functional catalyst may comprise a hydroxyapatite (HAP) combined with one or more of the above metals.

In some embodiments, the condensation catalyst may also include a zeolite and other microporous supports that contain Group IA compounds, such as Li, Na, K, Cs and Rb. Preferably, the Group IA material may be present in an amount less than that required to neutralize the acidic nature of the support. A metal function may also be provided by the addition of group VIIIB metals, or Cu, Ga, In, Zn or Sn. In some embodiments, the condensation catalyst may be derived from the combination of MgO and $Al_2O_3$ to form a hydrotalcite material. Another condensation catalyst may comprise a combination of MgO and $ZrO_2$, or a combination of ZnO and $Al_2O_3$. Each of these materials may also contain an additional metal function provided by copper or a Group VIIIB metal, such as Ni, Pd, Pt, or combinations of the foregoing.

The condensation reaction mediated by the condensation catalyst may be carried out in any reactor of suitable design, including continuous-flow, batch, semi-batch or multi-system reactors, without limitation as to design, size, geometry, flow rates, and the like. The reactor system may also use a fluidized catalytic bed system, a swing bed system, fixed bed system, a moving bed system, or a combination of the above. In some embodiments, bi-phasic (e.g., liquid-liquid) and tri-phasic (e.g., liquid-liquid-solid) reactors may be used to carry out the condensation reaction.

In some embodiments, an acid catalyst may be used to optionally dehydrate at least a portion of the reaction product. Suitable acid catalysts for use in the dehydration reaction may include, but are not limited to, mineral acids (e.g., HCl, $H_2SO_4$), solid acids (e.g., zeolites, ion-exchange resins) and acid salts (e.g., $LaCl_3$). Additional acid catalysts may include, without limitation, zeolites, carbides, nitrides, zirconia, alumina, silica, aluminosilicates, phosphates, titanium oxides, zinc oxides, vanadium oxides, lanthanum oxides, yttrium oxides, scandium oxides, magnesium oxides, cerium oxides, barium oxides, calcium oxides, hydroxides, heteropolyacids, inorganic acids, acid modified resins, base modified resins, and any combination thereof. In some embodiments, the dehydration catalyst may also include a modifier. Suitable modifiers may include, for example, La, Y, Sc, P, B, Bi, Li, Na, K, Rb, Cs, Mg, Ca, Sr, Ba, and any combination thereof. The modifiers may be useful, inter alia, to carry out a concerted hydrogenation/dehydrogenation reaction with the dehydration reaction. In some embodiments, the dehydration catalyst may also include a metal. Suitable metals may include, for example, Cu, Ag, Au, Pt, Ni, Fe, Co, Ru, Zn, Cd, Ga, In, Rh, Pd, Ir, Re, Mn, Cr, Mo, W, Sn, Os, alloys, and any combination thereof. The dehydration catalyst may be self supporting, supported on an inert support or resin, or it may be dissolved in a fluid.

In accordance with the description provided above, in some embodiments, the present disclosure provides biomass conversion systems that may be used for processing cellulosic biomass solids. In some embodiments, the biomass conversion systems may comprise a hydrothermal digestion unit; a first fluid conduit configured to remove a first fluid from the hydrothermal digestion unit and return the first fluid thereto; and a viscosity measurement device with the hydrothermal digestion unit or in flow communication with the hydrothermal digestion unit. Using the biomass conversion systems, a phenolics liquid phase may be formed and deviscosified as necessary to effectively process cellulosic biomass solids.

In some embodiments, the biomass conversion systems may further comprise a solids introduction mechanism coupled to the top of the hydrothermal digestion unit. Suitable solids introduction mechanisms have been described in more detail hereinabove. In some embodiments, the solids introduction mechanism may be configured to introduce cellulosic biomass solids to the hydrothermal digestion unit while the hydrothermal digestion unit maintains a pressurized state.

In some embodiments, the biomass conversion systems may further comprise a feedback mechanism that is communicatively coupled to the viscosity measurement device and a temperature control mechanism. A reading obtained by the viscosity measurement device may be fed to the temperature control device, and if the viscosity measurement is above a threshold value, the temperature control mechanism may be activated to regulate the deviscosification of the phenolics liquid phase.

In some embodiments, the first fluid conduit may be configured to return the first fluid from an upper portion of the hydrothermal digestion unit to a lower portion of the hydrothermal digestion unit. That is, the first fluid conduit may be configured such that the first fluid can be circulated through the hydrothermal digestion unit, such that the first fluid enters the hydrothermal digestion unit as an upwardly directed fluid stream.

In some embodiments, the biomass conversion systems may further comprise a second fluid conduit configured to remove a second fluid from the hydrothermal digestion unit. In some embodiments, the second fluid conduit may be configured to return the second fluid to the hydrothermal digestion unit. For example, in some embodiments, the second fluid conduit may be configured to return the second fluid from a lower portion of the hydrothermal digestion unit to an upper portion of the hydrothermal digestion unit.

In some embodiments, the viscosity measurement device may be located within the hydrothermal digestion unit. In other embodiments, the viscosity measurement device may be located within the second fluid conduit or be in flow communication with the second fluid conduit.

The biomass conversion systems and methods described herein will now be described with further reference to the drawings. When an element performs a like function in two or more figures, the same reference character will be used at each occurrence, and the element will only be described in detail a single time.

Figure 2:
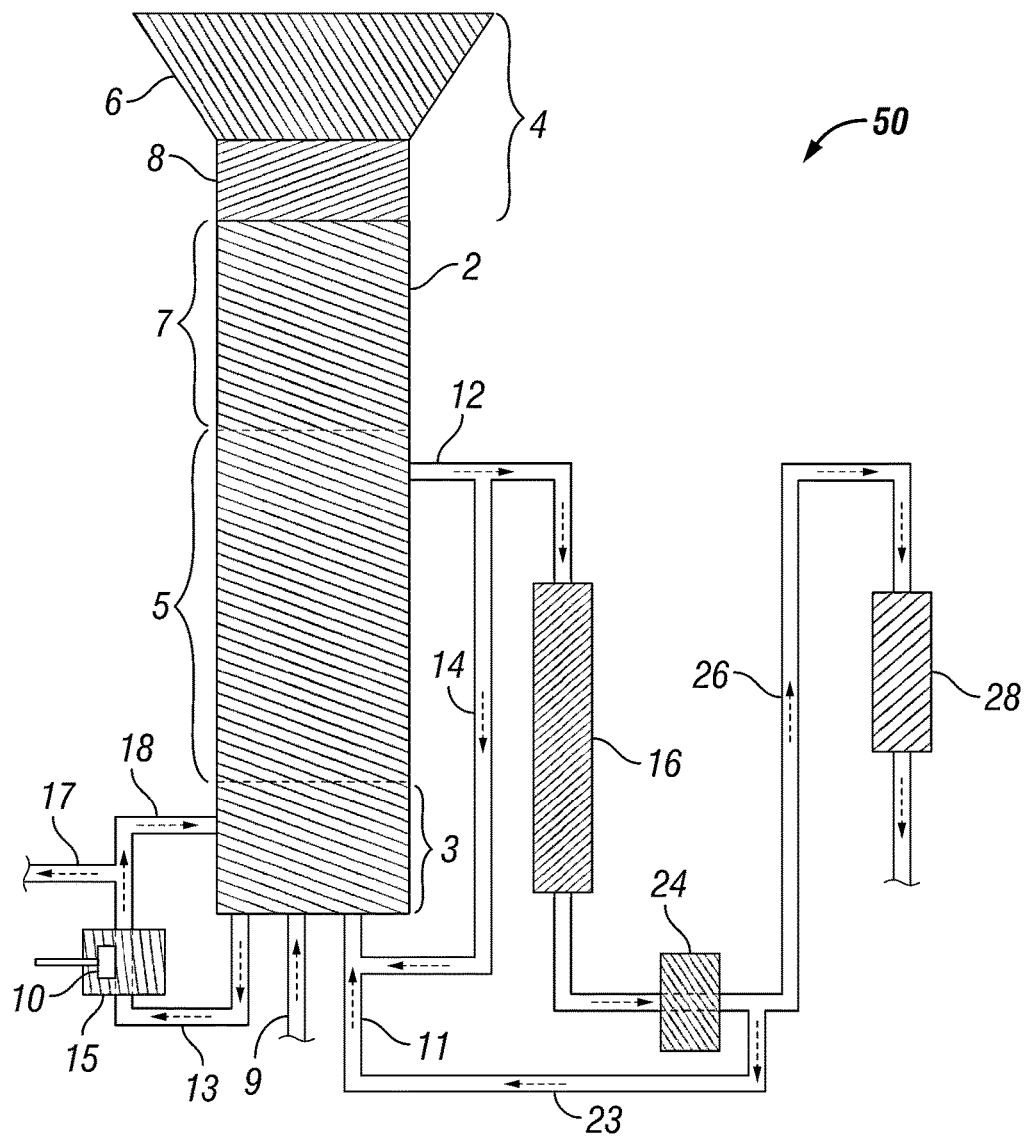

FIGS. 1 and 2 show schematics of illustrative biomass conversion systems 1 and 50 in which a phenolics liquid phase may form and be further processed. As depicted in the FIGURES, cellulosic biomass solids may be introduced to hydrothermal digestion unit 2 via solids introduction mechanism 4. Solids introduction mechanism 4 may comprise loading mechanism 6 and pressure transition zone 8, which may elevate the cellulosic biomass solids from atmospheric pressure to a pressure near that of the operating pressure of hydrothermal digestion unit 2, thereby allowing continuous or semi-continuous introduction of cellulosic biomass solids to take place without fully depressurizing hydrothermal digestion unit 2. Suitable loading mechanisms and pressure transition zones have been described in more detail hereinabove. Hydrothermal digestion unit 2 contains cellulosic biomass solids, a digestion solvent, and a slurry catalyst. In the interest of clarity, the cellulosic biomass solids and slurry catalyst have not been depicted in the FIGURES, but it is to be understood that at least a portion of the slurry catalyst particulates are distributed within the cellulosic biomass solids.

Upon digestion of the cellulosic biomass solids in the presence of the digestion solvent, phase separation occurs. Typically, a phenolics liquid phase occurs in zone 3 of hydrothermal digestion unit 2, and an aqueous phase containing an alcoholic component derived from the cellulosic biomass solids occurs in zone 5 of hydrothermal digestion unit 2. Depending on process conditions, a light organics phase may also occur in zone 7 of hydrothermal digestion unit 2.

Before or while digesting the cellulosic biomass solids, the slurry catalyst may be distributed in the cellulosic biomass solids using fluid flow, particularly upwardly directed fluid flow. Upwardly directed fluid flow may be supplied with gas inlet line 9 or fluid return line 11. As the phenolics liquid phase forms, at least a portion of the slurry catalyst may be accumulated therein.

Continuously, or at a desired time, the viscosity of the phenolics liquid phase may be reduced to a desired degree. Monitoring of the viscosity may be conducted using viscosity measurement device 10. In the embodiment depicted in FIG. 1, viscosity measurement device 10 may be located within hydrothermal digestion unit 2, and viscosity reduction may take place therein by heating the phenolics liquid phase in the presence of molecular hydrogen for a sufficient length of time and at a sufficient temperature to reduce the viscosity to a desired degree. In order to prevent excessive quantities of the phenolics liquid phase from building in hydrothermal digestion unit 2, at least a portion of this phase may be removed via drain 19. Separation of the slurry catalyst removed therewith may then take place after removal of the deviscosified phenolics liquid phase from hydrothermal digestion unit 2. In the embodiment depicted in FIG. 2, the phenolics liquid phase may be removed from hydrothermal digestion unit 2 via line 13 and conveyed to lignin processing unit 15, which contains viscosity measurement device 10 therein. Optionally, the phenolics liquid phase may be returned to hydrothermal digestion unit 2 via line 18 after having its viscosity reduced, or it may be removed from system 50 via line 17. Various components may be formed from the lignin upon deviscosification of the phenolics liquids phase, and these components (e.g., methanol and various phenolic compounds) may be removed via line 17 as well. Optionally, separation of the slurry catalyst from the phenolics liquid phase may occur in lignin processing unit 15 following deviscosification.

Referring again to the FIGURES, the alcoholic component in the aqueous phase may be withdrawn from hydrothermal digestion unit 2 via line 12. If desired, at least a portion of the aqueous phase may be recirculated to hydrothermal digestion unit 2 via recycle line 14 and fluid return line 11. For example, circulation of the aqueous phase may promote fluidization of the slurry catalyst, and reduce temperature gradients in hydrothermal digestion unit 2. Optionally, the slurry catalyst may circulate through lines 11, 12, and 14.

Optionally, an additional catalytic reduction reaction may be conducted on the aqueous phase. As described above, the additional catalytic reduction reaction may reduce the degree of oxygenation present in the alcoholic component, further promote stabilization of soluble carbohydrates, or any combination thereof. Accordingly, biomass conversion systems 1 and 50 may optionally include polishing reactor 16, which contains a catalyst capable of activating molecular hydrogen. The catalyst present in polishing reactor 16 may be the same as or different than that present in hydrothermal digestion unit 2. In the event that polishing reactor 16 is omitted, the aqueous phase from line 12 may be directly fed forward for further processing, as described below.

Optionally, biomass conversion systems 1 and 50 may contain drying unit 24. Drying unit 24 may employ any suitable technique for at least partially removing water from the aqueous phase, thereby producing an alcoholic component that is at least partially dried. Suitable techniques for removing water from the aqueous phase may include, for example, contacting the aqueous phase with a drying agent, distillation to remove water, or any combination thereof. At least partial removal of water from the aqueous phase may be desirable to prolong the life of downstream catalysts that are sensitive to water (e.g., ZSM-5). Optionally, after being at least partially dried, at least a portion of the dried alcoholic component may be returned to hydrothermal digestion unit 2 via line 23.

After optionally having at least a portion of the water in the aqueous phase removed in drying unit 24, the alcoholic component may be transferred via line 26 to reforming reactor 28, where one or more reforming reactions may take place. The reforming reaction taking place therein may be catalytic or non-catalytic. Although only one reforming reactor 28 has been depicted in the FIGURES, it is to be understood that any number of reforming reactors may be present. In some embodiments, a first reforming reaction may comprise a condensation reaction. Additional reforming reactions may comprise any combination of further catalytic reduction reactions (e.g., hydrogenation reactions, hydrogenolysis reactions, hydrotreating reactions, and the like), further condensation reactions, isomerization reactions, desulfurization reactions, dehydration reactions, oligomerization reactions, alkylation reactions, and the like. Such transformations may be used to convert the initially produced soluble carbohydrates into a biofuel. Such biofuels may include, for example, gasoline hydrocarbons, diesel fuels, jet fuels, and the like. As used herein, the term "gasoline hydrocarbons" refers to substances comprising predominantly $C_5$-$C_9$ hydrocarbons and having a boiling point of 32° C. to about 204° C. More generally, any fuel blend meeting the requirements of ASTM D2887 may be classified as a gasoline hydrocarbon. Suitable gasoline hydrocarbons may include, for example, straight run gasoline, naphtha, fluidized or thermally catalytically cracked gasoline, VB gasoline, and coker gasoline. As used herein, the term "diesel fuel" refers to substances comprising paraffinic hydrocarbons and having a boiling point ranging between about 187° C. and about 417° C., which is suitable for use in a compression ignition engine. More generally, any fuel blend meeting the requirements of ASTM D975 may also be defined as a diesel fuel. As used herein, the term "jet fuel" refers to substances meeting the requirements of ASTM D1655. In some embodiments, jet fuels may comprise a kerosene-type fuel having substantially $C_8$-$C_{16}$ hydrocarbons (Jet A and Jet A-1 fuels). In other embodiments, jet fuels may comprise a wide-cut or naphtha-type fuel having substantially $C_5$-$C_{15}$ hydrocarbons present therein (Jet B fuels).

To facilitate a better understanding of the present invention, the following examples of preferred embodiments are given. In no way should the following examples be read to limit, or to define, the scope of the invention.

EXAMPLES

Example 1

Formation and Separation of a Phenolics Liquid Phase

A 75 mL Parr5000 reactor was charged with 20.2 grams of 25% 2-propanol solvent in deionized water, 0.12 grams of sodium carbonate buffer, and 0.302 grams of grams of sulfided nickel oxide promoted cobalt molybdate catalyst (DC-2534, Criterion Catalyst & Technologies L.P., containing 1-10% cobalt oxide and molybdenum trioxide (up to 30 wt %) on alumina, and less than 2% nickel). The catalyst was previously sulfided as described in United States Patent Application Publication 2010/0236988, which is incorporated herein by reference in its entirety. The reactor was then charged with 4.98 grams of southern pine mini-chips (39% moisture, nominal dimensions of 3 mm×5 mm×5 mm), before pressurizing with 52 bar of hydrogen. The stirred reactor was heated to 190° C. for 1 hour, followed by heating to 240° C. for 4 hours to complete a 5 hour cycle. At the end of the cycle, the reactor was cooled and allowed to gravity settle overnight. 4 grams of liquid phase was withdrawn as product, and 4 grams of wood chips were added to initiate a subsequent reaction cycle.

The foregoing sequence was continued for 28 cycles of wood chip addition, after which time the upper aqueous phase (containing glycols and monooxygenated compounds) was decanted from a black, lower phase which also contained the settled catalyst. The lower phase was too viscous to flow at room temperature (see Example 2). One part of the lower phase was dissolved in 10 parts n-octanol and analyzed by gas chromatography.

Gas chromatography was conducted using a 60 m×0.32 mm ID DB-5 column of 1 m thickness, with 50:1 split ratio, 2 mL/min helium flow, and column oven held at 40° C. for 8 minutes, followed by ramp to 285° C. at 10° C./min, and a hold time of 53.5 minutes. The injector temperature was set at 250° C., and the detector temperature was set at 300° C. A range of alkanes, monooxygenated aldehyde and ketones, glycols, and polyols were observed in the aqueous phase, each with a volatility greater than the $C_6$ sugar alcohol sorbitol. Ethylene glycol, 1,2-propylene glycol, and glycerol were all observed. In the phenolics liquid phase, no peaks having a volatility greater than sorbitol could be detected.

Example 2

Viscosity and Flow Behavior of the Phenolics Liquid Phase 1.002 grams of the lower phase from Example 1 was placed in a vial on a block heater and heated to 110° C. for 30 minutes to observe flow behavior. No flow of the lower phase was observed using a falling film viscosity assessment method, either at room temperature or at 110° C., leading to an estimated viscosity of greater than 10,000 cP. Basis for the estimated viscosity was flow behavior observed in an analogous test with ambient temperature molasses.

Samples of the lower phase were diluted 1:10 into 50% ethanol and heated to 80° C., upon which a flowable, non-miscible lower phase was observed with an estimated viscosity of 1000 cP, as determined via falling film viscosity measurement of a standard material (glycerol). A flowable but immiscible lower phase was also obtained by mixing 1 part of the lower phase with 10 parts of 45% propylene glycol/5% ethylene glycol in deionized water. The lower phase was completely dissolved at 80° C. in a mixture of 90% 1,2-propylene glycol/10% ethylene glycol. Upon addition of 24% water to the 1,2-propylene glycol/ethylene glycol solvent, the lower phase was no longer miscible, and separate upper and lower phases were observed.

Example 3

High Temperature Reversion of the Phenolics Liquid Phase 0.306 grams of the lower phase produced in Example 1 were mixed with 0.101 grams of the sulfided catalyst and 0.05 grams of potassium carbonate buffer in a 5 mL heavy wall reaction vial with V-shaped bottom. The vial was carefully heated for 5 hours at 290° C. in a Parr5000 reactor packed with sand for thermal heat transfer under an initial pressure of 25 bar of hydrogen.

Following thermal treatment of the lower phase, it became flowable at 110° C. with no solvent addition required. The viscosity was estimated as greater than 1000 cP. A sample dissolved 1:10 in n-octanol for GC analysis again indicated no detectable peaks having a volatility less than sorbitol. Subsequent analysis of the hydrotreated lower phase indicated the presence of low concentrations of substituted phenols, including propyl phenols.

Example 4

Origin of the Phenolics Liquid Phase

A Parr5000 reactor was charged with 20 grams of 45% 1,2-propylene glycol/5% ethylene glycol in deionized water solvent. 0.30 grams of the sulfided cobalt molybdate catalyst from Example 1 was added, along with 0.12 grams of potassium carbonate buffer. 2.0 grams of powdered cellulose (Sigma-Aldrich, less than 2% moisture) was then introduced to the reactor. The reactor was pressurized with 52 bar of hydrogen and heated to 190° C. for 1 hour, followed by heating to 250° C. for 4 hours to complete a 5 hour reaction cycle. At the end of each cycle, the reactor was cooled, and the phases were allowed separate overnight. A sample of the aqueous phase was removed via pipet after each cycle, and an equivalent amount of cellulose was added in the next cycle to maintain the liquid level in the reactor. Aqueous samples obtained after overnight settling were clear, and free of catalyst.

The reaction sequence was continued through 24 cycles, after which the reactor contents were poured into a glass beaker to observe phase formation. Only a small amount (less than 5 grams) of the aqueous phase remained in the reactor at this point. The reactor contents separated into an upper, oil-rich phase with density less than the aqueous phase and a clear, faintly yellow aqueous phase. No bottoms phase was observed, in contrast to the behavior observed when wood chips were processed in a similar manner. Catalyst was dispersed in the upper, oil-rich phase, and some remained at the bottom of the aqueous phase.

Example 5

High Temperature Reversion of the Phenolics Liquid Phase Containing Added Glycol Solvent A 100 mL Parr5000 reactor was charged with 65 grams of 45% 1,2-propylene glycol/5% ethylene glycol in deionized water solvent, 0.182 grams of potassium carbonate buffer, and 0.752 grams the sulfided cobalt molybdate catalyst from Example 1. The reactor was charged with 6.05 grams of southern pine mini-chips (39% moisture, having a nominal size 3 mm×5 mm×5 mm) and pressurized with 52 bar of hydrogen. The stirred reactor was heated to 190° C. for 1 hour, followed by ramping over 15 minutes to a temperature of 250° C. and holding, to complete a 5 hour cycle. At the end of the cycle, 5.4 grams of product was removed via filtered dip tube from the hot, stirred reactor. The reactor was then cooled, and 6.0 grams of wood chips were added to initiate a second reaction cycle. The sequence was continued for 8 cycles of wood chip addition, after which stirring was discontinued, and the reactor contents were allowed to gravity settle. Samples removed after cycle 4 contained 2 or 3 liquid phases. Coalescence, separation and settling of a phenolics liquid phase occurred rapidly in less than 30 seconds during sampling into hot sample vials.

After cooling at the end of eight cycles, the aqueous phase was decanted from the reactor, leaving behind an immiscible, viscous lower phase. 0.604 grams of the lower phase was combined with 22.5 grams of 1,2-propylene glycol/2.5 grams of ethylene glycol and heated to 110° C. in a block heater. Dissolution occurred in the glycol solvent, leaving behind a small amount of solid catalyst which was readily separated by decantation.

The glycol solvent containing the dissolved lower phase was transferred to a 75 mL Parr5000 reactor, together with 0.12 grams of potassium carbonate buffer and 0.301 grams of fresh sulfided cobalt molybdate catalyst. The reactor was pressurized with 24 bar of hydrogen and heated to 290° C. for 5 hours. After cooling, the reactor contents separated into an upper oil layer (22% of the total mass) containing a myriad of oxygenated hydrocarbons and alkanes having a volatility greater than sorbitol. The lower phase contained unreacted propylene glycol, from which conversion was estimated as 78%. As demonstrated in this Example, hydrotreating was used to simultaneously revert the lignin in the phenolics liquid phase and convert at least a portion of a glycol into compounds having a reduced degree of oxygenation.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods may also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
providing cellulosic biomass solids in the presence of a digestion solvent, molecular hydrogen, and a slurry catalyst capable of activating molecular hydrogen;
heating the cellulosic biomass solids to a first temperature of between about 200° C. and about 250° C. and at least partially converting the cellulosic biomass solids into a phenolics liquid phase comprising lignin, an aqueous phase comprising an alcoholic component derived from the cellulosic biomass solids, and an optional light organics phase;
wherein at least a portion of the slurry catalyst accumulates in the phenolics liquid phase as it forms;
subsequent to the formation of the phenolics liquid phase, heating the phenolics liquid phase in the presence of molecular hydrogen to a second temperature that is higher than the first temperature said temperature in the range of from about 270° C. to about 290° C., thereby reducing the viscosity of the phenolics liquid phase;
wherein the phenolics liquid phase is separated from the aqueous phase before reducing the viscosity of the phenolics liquid phase and wherein reducing the viscosity of the phenolics liquid phase takes place in the presence of the cellulosic biomass solids; and
after reducing the viscosity of the phenolics liquid phase, separating the slurry catalyst therefrom.

2. The method of claim 1, wherein the second temperature is sufficient to at least partially depolymerize the lignin in the phenolics liquid phase.

3. The method of claim 1, further comprising:
measuring the viscosity of the phenolics liquid phase.

4. The method of claim 3, wherein reducing the viscosity and measuring the viscosity take place at the same time.

5. The method of claim 1, wherein the alcoholic component is formed by a catalytic reduction reaction of soluble carbohydrates, the soluble carbohydrates being derived from the cellulosic biomass solids.

6. The method of claim 5, wherein the alcoholic component comprises a monohydric alcohol, a glycol, a triol, or any combination thereof.

7. The method of claim 5, wherein the alcoholic component comprises a glycol.

8. The method of claim 1, further comprising:
separating the phenolics liquid phase from the cellulosic biomass solids after reducing its viscosity.

9. The method of claim 1, wherein the viscosity of the phenolics liquid phase is reduced by at most about 20%.

10. The method of claim 1, further comprising:
forming methanol from the phenolics liquid phase while reducing its viscosity.

11. The method of claim 1, further comprising:
separating the phenolics liquid phase and the slurry catalyst accumulated therein from the cellulosic biomass solids.

12. The method of claim 11, further comprising:
returning the slurry catalyst to the cellulosic biomass solids.

13. The method of claim 1, further comprising:
circulating at least a portion of the aqueous phase through the cellulosic biomass solids.

14. The method of claim 1 wherein reducing the viscosity of the phenolics liquid phase comprises reacting the phenolics liquid phase with a base.

15. The method of claim 1, wherein reducing the viscosity of the phenolics liquid phase comprises heating the phenolics liquid phase in the presence of molecular hydrogen and the slurry catalyst.

16. The method of claim 15, wherein the phenolics liquid phase is heated to a temperature sufficient to at least partially depolymerize the lignin therein.

17. The method of claim 16, further comprising:
forming methanol from the phenolics liquid phase while reducing its viscosity.

18. The method of claim 15, wherein the phenolics liquid phase is separated from the cellulosic biomass solids before reducing its viscosity.

19. The method of claim 1, wherein the viscosity is reduced sufficiently for the slurry catalyst accumulated in the phenolics liquid phase to be separated therefrom.

20. The method of claim 19, further comprising:
separating the phenolics liquid phase and the slurry catalyst accumulated therein from the cellulosic biomass solids; and
after reducing the viscosity of the phenolics liquid phase, separating the slurry catalyst therefrom.

21. The method of claim 20, further comprising:
returning the slurry catalyst to the cellulosic biomass solids.

22. The method of claim 1, further comprising:
circulating at least a portion of the aqueous phase through the cellulosic biomass solids.

* * * * *